(12) United States Patent
Malchi

(10) Patent No.: US 12,054,222 B2
(45) Date of Patent: Aug. 6, 2024

(54) POWER TRANSMISSION

(71) Applicant: Raz Malchi, Kerem Ben Shemen (IL)

(72) Inventor: Raz Malchi, Kerem Ben Shemen (IL)

( * ) Notice: Subject to any disclaimer, the term of this patent is extended or adjusted under 35 U.S.C. 154(b) by 0 days.

(21) Appl. No.: 18/189,745

(22) Filed: Mar. 24, 2023

(65) Prior Publication Data

US 2023/0303211 A1     Sep. 28, 2023

Related U.S. Application Data

(63) Continuation-in-part of application No. PCT/IL2021/051119, filed on Sep. 14, 2021.

(30) Foreign Application Priority Data

Sep. 24, 2020  (IL) .......................................... 277586

(51) Int. Cl.
*F16H 37/12*  (2006.01)
*B62M 9/06*  (2006.01)
*B62M 11/06*  (2006.01)

(52) U.S. Cl.
CPC .............. *B62M 11/06* (2013.01); *B62M 9/06* (2013.01); *F16H 37/12* (2013.01)

(58) Field of Classification Search
CPC ........ B62M 11/06; B62M 9/06; B62M 11/04; B62M 11/145; B62M 11/16; B62M 11/14; B62M 11/08; F16H 37/12; F16H 9/26

See application file for complete search history.

(56) References Cited

U.S. PATENT DOCUMENTS

| | | | |
|---|---|---|---|
| 512,479 A * | 1/1894 | Mckenzie | F16H 3/54 475/314 |
| 4,447,068 A | 5/1984 | Brooks | |
| 5,078,416 A * | 1/1992 | Keyes | B62M 17/00 280/281.1 |
| 5,622,081 A * | 4/1997 | Clements | B62M 25/02 280/238 |

(Continued)

FOREIGN PATENT DOCUMENTS

| CN | 111377034 A | 7/2020 |
|---|---|---|
| CN | 111377035 A | 7/2020 |

(Continued)

*Primary Examiner* — Justin Holmes
(74) *Attorney, Agent, or Firm* — Browdy and Neimark, PLLC

(57) ABSTRACT

A gear transmission including a housing accommodating a gear ratio changing mechanism, a gear plate articulated to an output shaft coaxially rotatable about an axis of a central hub of the housing and including a plurality of coaxially disposed gear rings selectively engaged by the gear ratio changing mechanism, a transmission plate coaxially rotatable about an axis of the central hub and having a peripheral gear ring coupled to the gear ratio changing mechanism including a pinion gear rotatably articulated with an axle and engaged with the peripheral gear ring of the transmission plate for transferring input rotary motion thereby received to the axle, a transmission pinion gear rotatable by the axle and displaceable therealong for engaging one of the coaxially disposed gear rings of the gear plate, and a manipulator configured for selective radial displacing the transmission pinion gear over the axle between gear rings of the gear plate.

20 Claims, 27 Drawing Sheets

(56) References Cited

U.S. PATENT DOCUMENTS

| | | | |
|---|---|---|---|
| 7,434,489 B1 | 10/2008 | Scranton | |
| 11,267,531 B2 * | 3/2022 | Smith | ................... B62M 1/36 |
| 2010/0298084 A1 | 11/2010 | Witonis et al. | |
| 2011/0062678 A1 | 3/2011 | Chen et al. | |
| 2019/0300116 A1 | 10/2019 | Smith et al. | |
| 2019/0359288 A1 | 11/2019 | Ha | |

FOREIGN PATENT DOCUMENTS

| | | |
|---|---|---|
| DE | 3241676 A1 | 5/1984 |
| KR | 20020066353 A | 8/2002 |

* cited by examiner

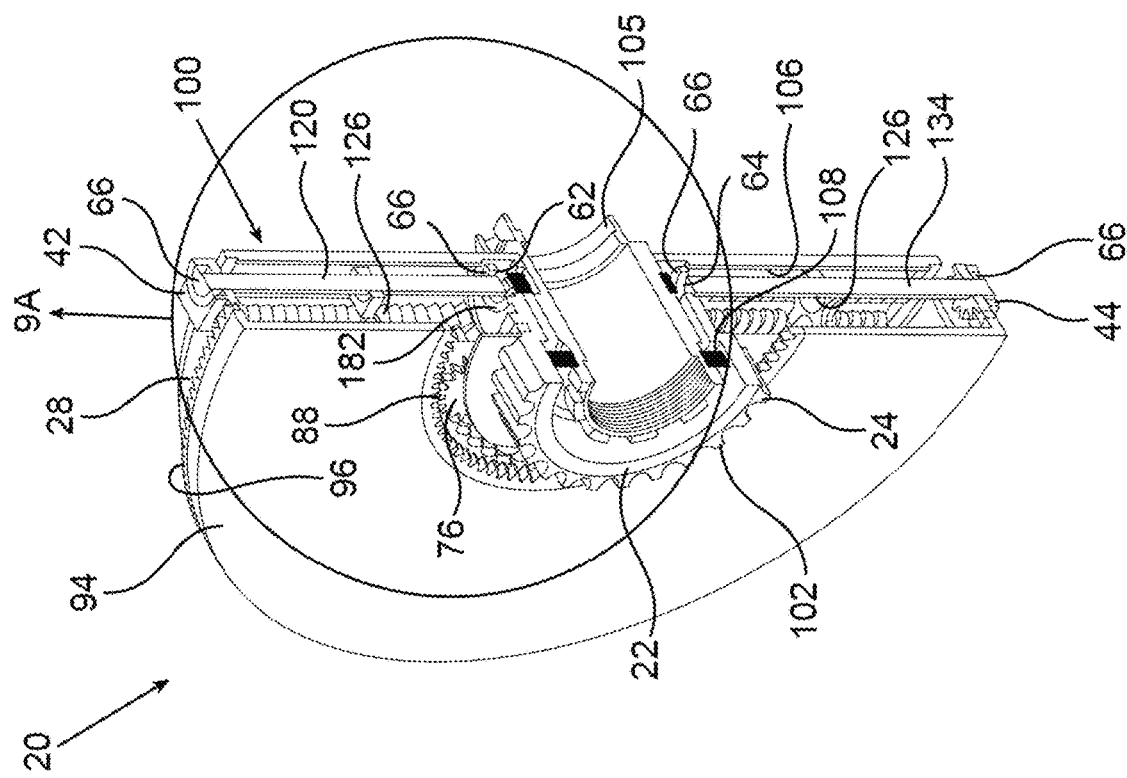
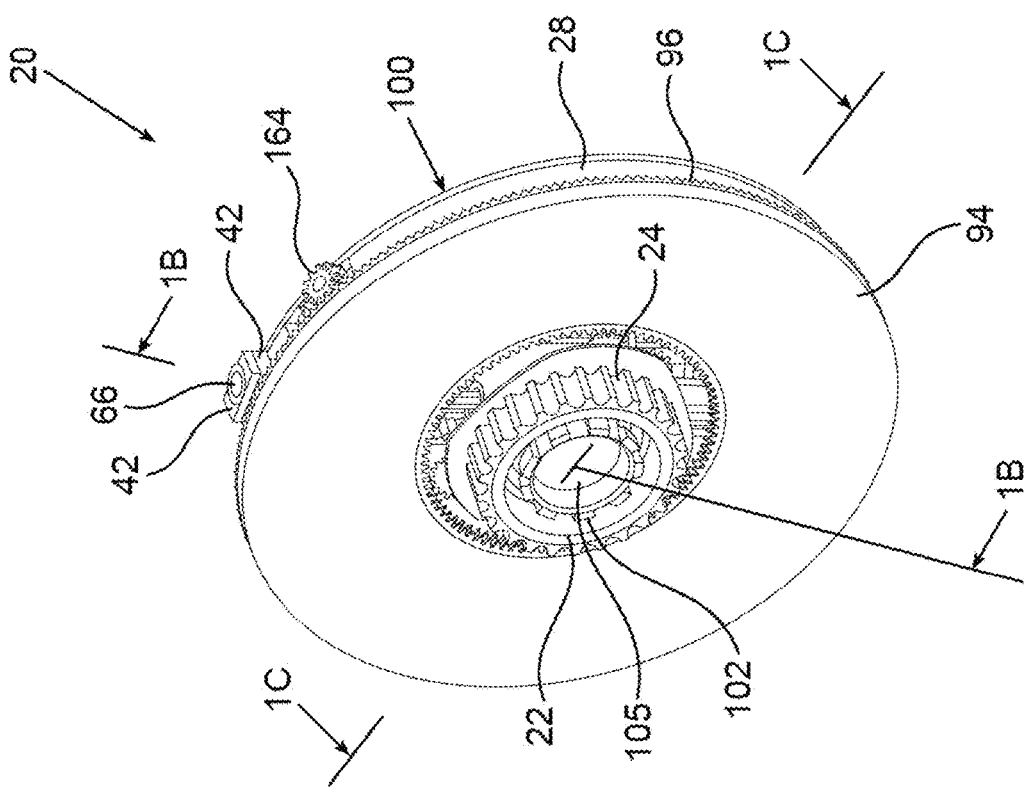
FIG. 1B
FIG. 1A

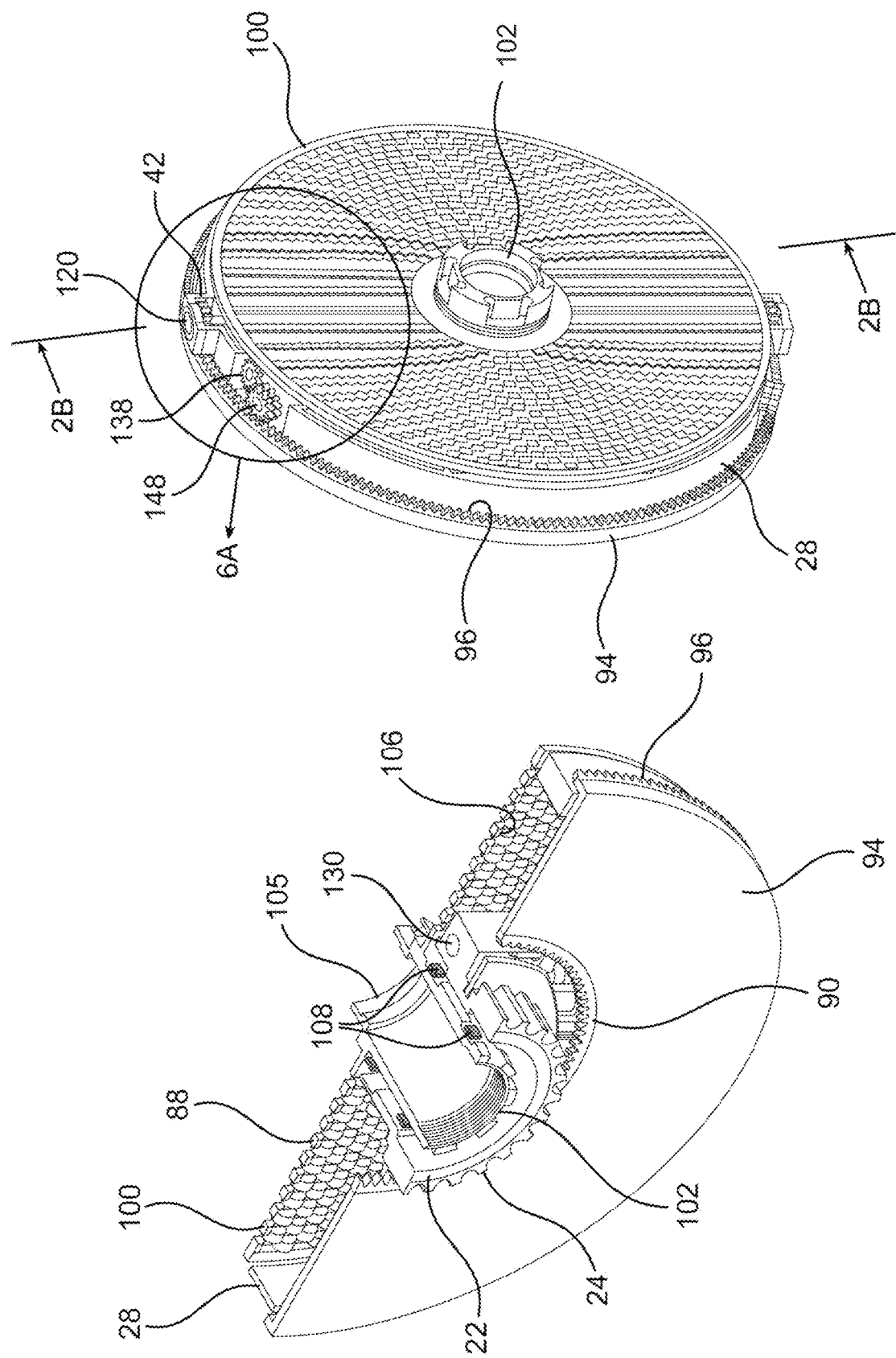

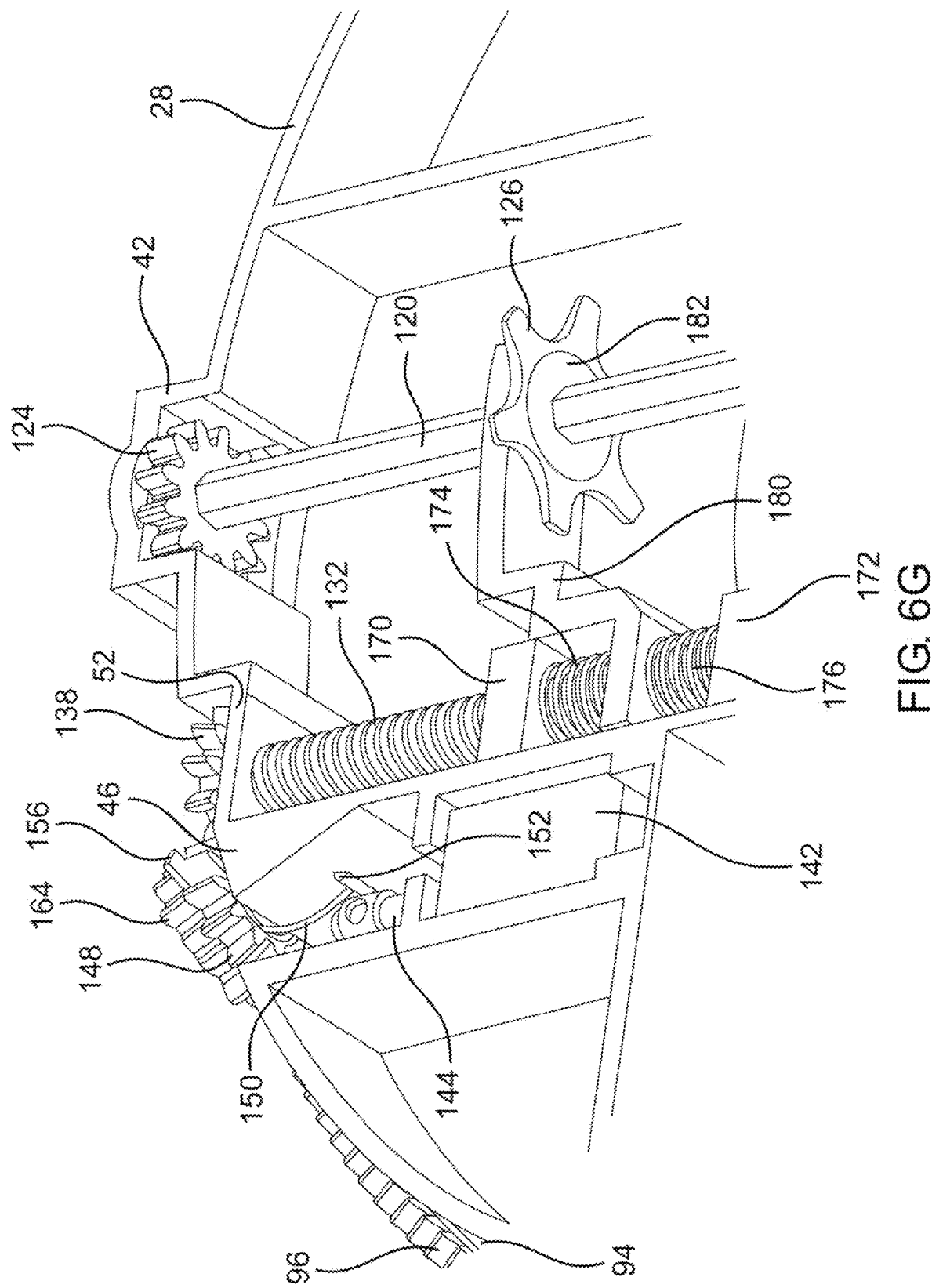

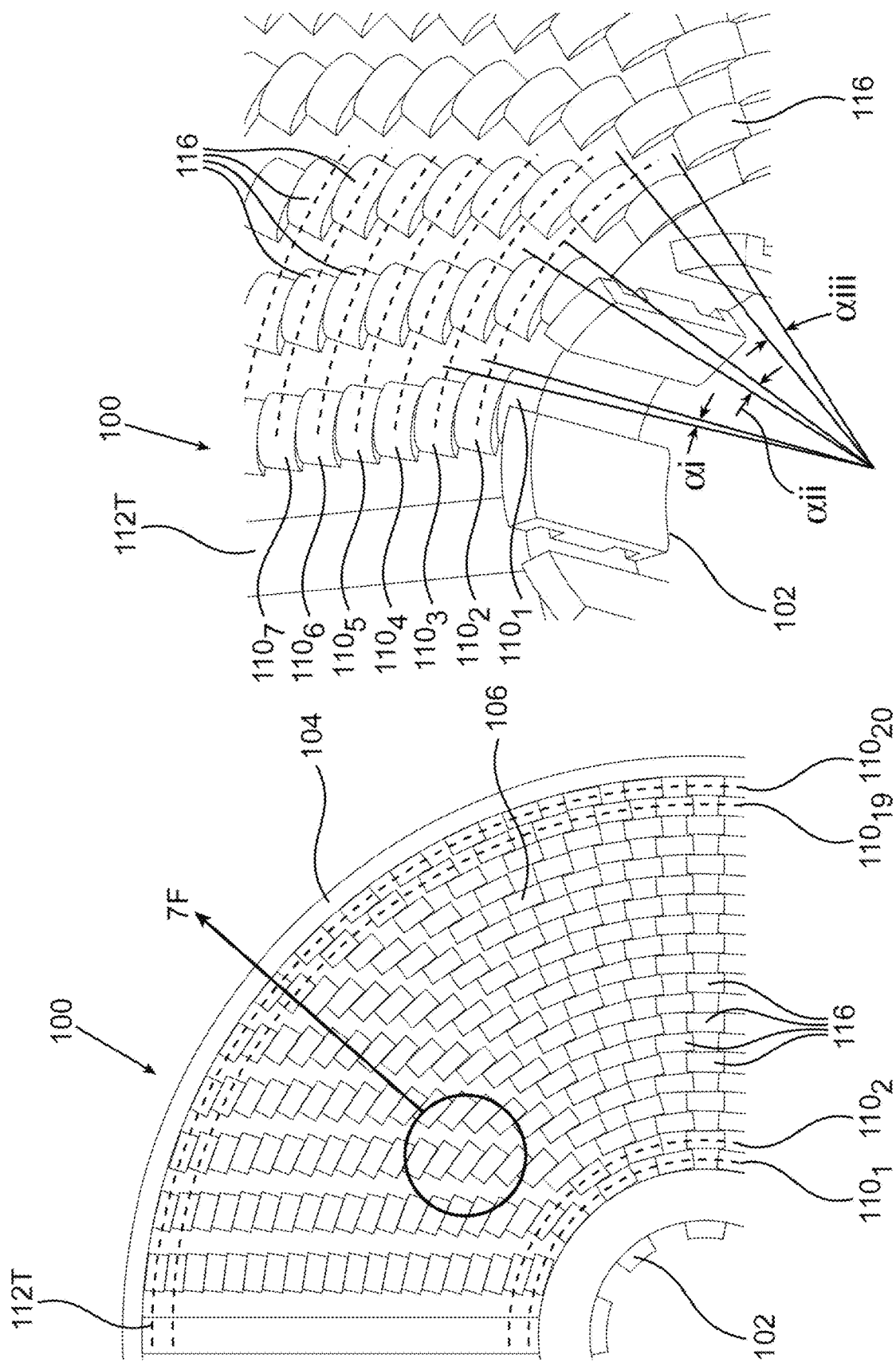

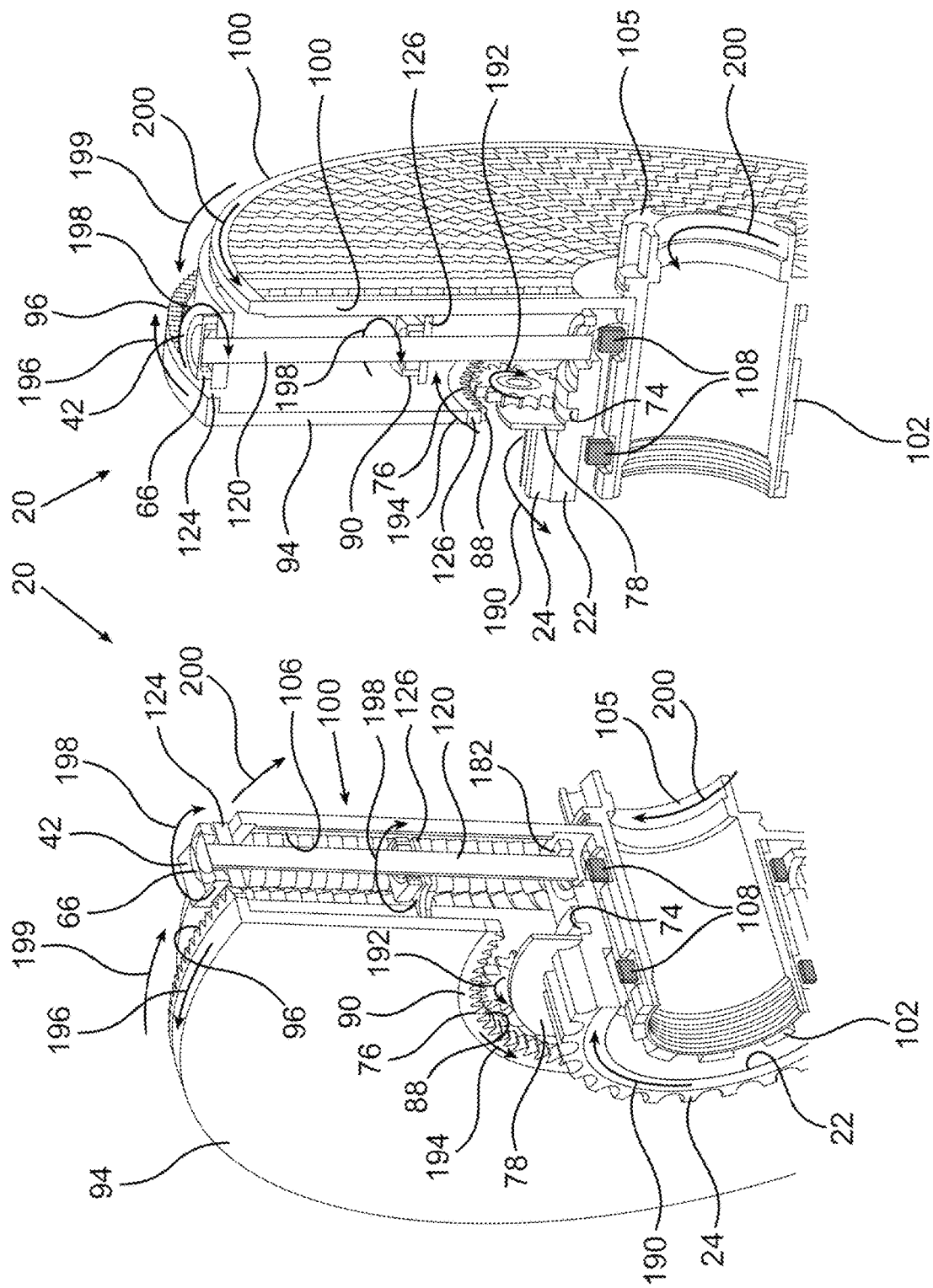

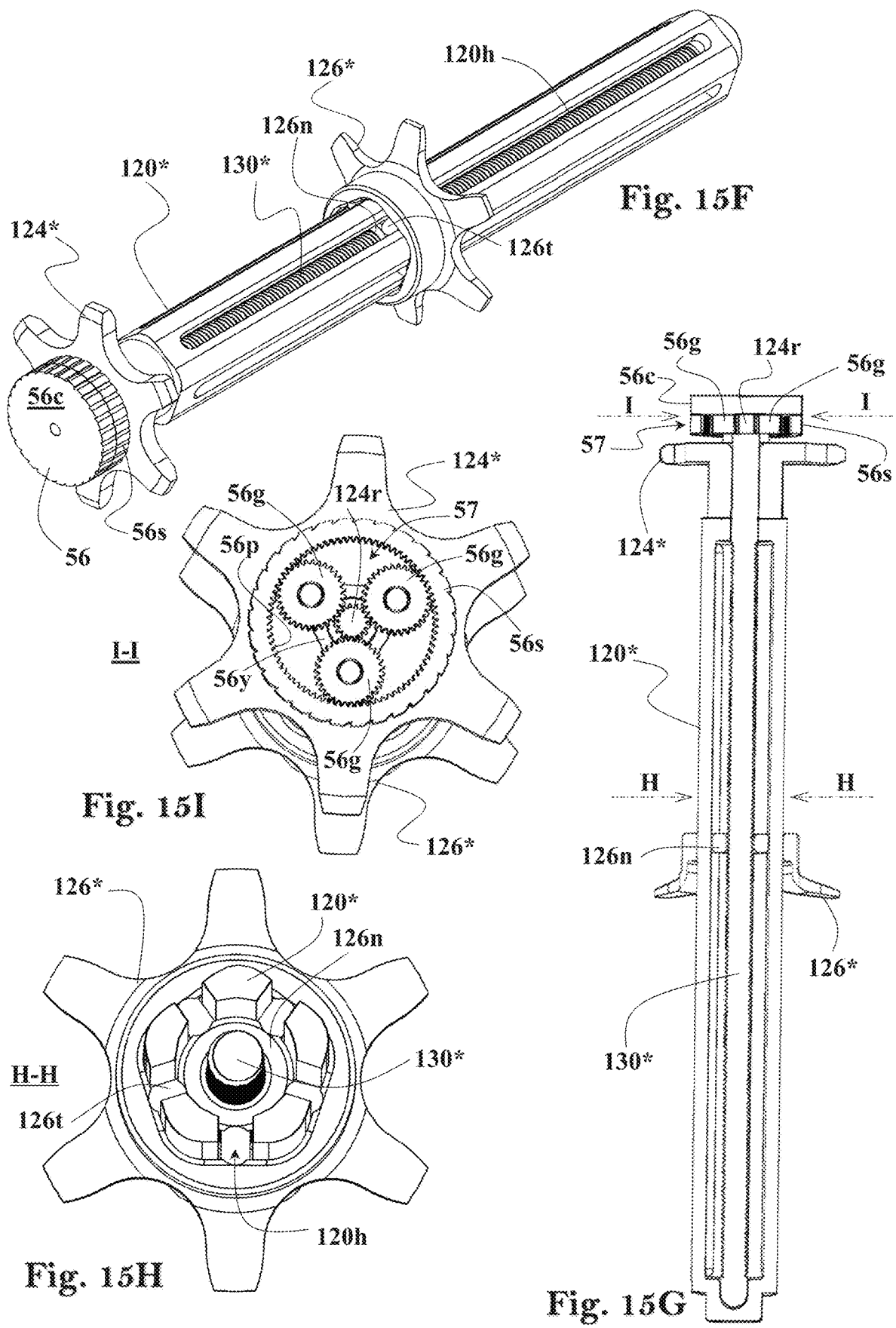

POWER TRANSMISSION

TECHNOLOGICAL FIELD

The present disclosure is directed to a power transmission and to a utility unit configured with such a power transmission.

BACKGROUND ART

References considered to be relevant as background to the presently disclosed subject matter are hereby listed: US20190359288; CN111377034A; CN111377035A; US2019300116; US20110062678; KR20020066353A; U.S. Pat. No. 7,434,489.

Acknowledgement of the above references herein is not to be inferred as meaning that these are in any way relevant to the patentability of the presently disclosed subject matter.

BACKGROUND

US20190359288 discloses a multi-stage transmission bicycle, comprises: a transmission plate which rotates with the pedals and has a plurality of transmission gear teeth formed concentrically on the surface and driving gear teeth on the outer peripheral side; a transmission unit having an input shaft, which is coupled to the driving teeth and is for receiving transmission of the rotational force, a ring gear, which rotates by means of the input shaft, an output shaft, which is disposed inside the ring gear, has a sun gear, and is coupled to the rear wheel, pinion gears, which are coupled to the sun gear and inner gear teeth of the ring gear, a carrier, which couples the pinion gears, and a driving gear which is gear coupled to the carrier; and a number-of-revolutions changing module for changing the rotational direction of the driving gear and the number of revolutions of the driving gear.

CN111377034A discloses a gear shifting system applied to bicycles, to use the drive shaft to drive, can realize the automatic gear shifting function when riding, and at the same time avoid the problems of chain drop during riding and high friction during transmission; use the principle of centrifugal force to set the centrifugal force to drive the shift The combined device is installed on the rear tower gear shifting gear plate, and the centrifugal rotating frame drives the centrifugal hammer to convert the kinetic energy of spinning off into linear movement, so as to give thrust to the shift lever in the drive shaft according to the speed of the vehicle, and change the speed of the pedal shaft. The gear position of the rear wheel transmission; realizes that the rider does not need to be distracted to operate the manual gear lever, but the actual speed relative to the road is pushed through the shift lever in the centrifuge device, so that a suitable gear can be obtained It is used in the starting or climbing phase, and the automatic gear shifting in the acceleration and high-speed phases, so that you can easily and happily face various road conditions during riding; so you can focus more on the changes in road conditions during riding, and more Enjoy every ride safely.

CN111377035A relates to a bicycle, particularly to a bicycle speed control system, including the front pivot and the rear pivot, pivot front gear is fixed on the front and rear pivot provided on the rear gear, the rear gear of the bicycle rear wheel connection, front gear and rear gear ring radially has a number of ring gear, speed control system further includes a drive shaft, the drive shaft connected to the front end of the drive shaft the rear end of the front straight teeth, straight teeth, straight teeth after drive connected with the front and rear straight teeth, straight teeth along the shaft axial sliding front and rear straight teeth are connected to drive the slide drive structure of the present invention speed control system structure is simple, small footprint, and can save costs.

US20110062678 discloses a chainless bicycle includes a drive system having a speed change arrangement is provided. In a first mode of speed change a forward pulling of a forward cable clockwise pivots a front pivotal member to move the forward sleeve rearward so that a first toothed portion of the forward sleeve clears a second gearwheel to move into a first gearwheel to mesh with a toothed portion of the first gearwheel whereby rotating a shaft will rotate a drive gear, the first gearwheel, the second gearwheel, the forward sleeve, a drive shaft, a rear sleeve, a fourth gearwheel, second inner engaging members, second outer engaging members, a third gearwheel, and a rear axle co-rotating with a rear wheel.

US2019300116 discloses a bicycle drive system includes a front face gear, a rear face gear, a drive shaft, and a front roller-toothed gear assembly coupled to the first end of the drive shaft, and a rear roller-toothed gear assembly coupled to the second end of the drive shaft. Both the front roller-toothed gear assembly and the rear roller-toothed gear assembly include one or more roller elements. The roller-toothed gear assemblies are advantageous in ensuring the bicycle drive system is highly efficient, and is only minimally or not at all affected by dirt, water, contaminants, or other foreign matter typically experienced in un-clean riding conditions.

KR20020066353A discloses a shifting apparatus for a vertical gear in a multistage flat groove gear is provided to shift completely and promptly by moving the vertical gear in the multistage flat groove gear regardless of friction from foreign matters, and to lengthen a life span by preventing damage of the gear. CONSTITUTION: A shift operating unit(3) is fastened by a fixing pin(11) for restricting the axial movement of the vertical gear at absence of shift command, and a shift contact unit(4) is separated from a shift sill of a multistage flat recess gear(1). The fixing pin is eliminated in shifting, and the shift contact unit is moved. A first contact part of the shift contact unit is contacted to the shift sill of the multistage flat recess gear, and a second contact part is engaged with the shift operating unit. Shifting is performed with moving the shift operating unit according to rotation direction of the multistage flat recess gear. The life span of the shift system is extended with preventing damage against overload.

U.S. Pat. No. 7,434,489 discloses a bicycle drive system includes a front gear face, a rear gear face, a front guide assembly, a rear guide assembly, and a drive shaft coupled to a rear-suspension frame via a rear hub and a crank spindle. The bicycle drive system operates independently of the frame. Shifting from one gear to another is controlled by a shift controller. Each shift of the shift controller shifts both the front and rear guide assemblies at the same time. The shift controller is preferably coupled to the front and rear guide assemblies via a cable system.

GENERAL DESCRIPTION

Gear transmissions are widely used and a large variety of gear transmissions exist. One common use of gear transmissions is a bicycle gear transmission, used to change the ratio of rate and power at which a cyclist pedals and the rate at which the bicycles' wheel turns. Important parameters to be considered in choosing a gear transmission are, size, number of output gear ratios and weight, as well as considerations such as durability, servicing, ease of gear shifting, adaptively for electric operation, associated shifting mechanisms (e.g., front and rear derailleurs) and others.

According to a first aspect of the present disclosure there is a gear transmission comprising an input shaft and a coaxial output shaft, a planetary gear assembly configured with a sun gear fixedly articulated to the input shaft, a ring gear of the planetary gear assembly fixed at a hub of a transmission plate, said transmission plate configured with a peripheral gear ring; a gear ratio changing mechanism comprising a pinion gear engaged with the peripheral gear ring of the transmission plate and rotatable about a radial axis, and a transmission pinion gear rotatably articulated with the pinion gear; said transmission pinion gear being displaceable along the radial axis and configured for engaging with a rotatable gear plate; said gear plate is coaxially articulated with the output shaft and the gear plate is configured at an inside face thereof with a plurality of coaxially disposed gear rings, wherein the transmission pinion gear is engageable with a gear ring of gear plate, and wherein the gear ratio changing mechanism comprises a manipulator configured for selective radial displacing the transmission pinion gear between gear rings of the gear plate.

Hereinafter in the specification and claims the terms 'input shaft' and 'output shaft' are interchangeable and are used to denote a shaft at any side of the gear transmission, however being replaceable, such that input rotary motion can be imparted to either one of the input shaft and the output shaft and respectively an output rotary motion can be delivered at the other one of the respective input shaft and the output shaft.

According to particular examples of the disclosure the planetary gear assembly comprises several planetary pinion gears rotatably mounted on a carrier of the planetary gear assembly, said carrier being rotatably fixed, i.e. held in reaction, whereby the sun gear and the ring gear rotate at an opposite sense.

The gear transmission can further comprise a housing, said housing is rotatable with the input shaft, and is configured for accommodating the gear ratio changing mechanism, and wherein the radial axis of the pinion gear extends over a radial axis of the housing.

According to a particular embodiment, the gear ratio changing mechanism can comprise an upshift gear assembly and a downshift gear assembly, independent from one another, and configured for radial displacing the transmission pinion gear radially, wherein the upshift gear assembly is configured for displacing the transmission pinion gear radially inwards towards a smaller gear ring, and the downshift gear assembly is configured for displacing the transmission pinion gear radially outwards towards a larger gear ring.

According to another embodiment, the gear ratio changing mechanism comprises two or more gear changing sub-assemblies, operate in opposite senses, i.e. in mirror-like sense, resulting in that the transmission pinion gears the sub-assemblies move simultaneously and in registration towards one another or away from one another.

According to a particular embodiment, the gear ratio changing mechanism can be further configured with a gear changing pinion gear configurable for selectively engaging with the peripheral gear ring of the transmission plate, and a manipulating pinion gear engageable with the gear changing pinion gear, said manipulating pinion gear fixed over a threaded rod, whereby rotation of the threaded rod entails displacement of the manipulator which in turn entails radial displacement of the transmission pinion gear about a rotating axle extending about the radial axis of the transmission pinion gear.

The manipulator comprises, according to an embodiment of the disclosure, a manipulable lever configurable for radial displacing the transmission pinion at a radially inwards or radially outwards direction.

The gear ratio changing mechanism can comprise one or more electric manipulators configurable for radial displacing the transmission pinion. The one or more electric manipulators can be step motors, servo motors, solenoids, etc.

The one or more electric manipulators can be articulated for radial displacing the transmission pinion by a manipulable lever.

The housing can be configured for accommodating the one or more electric manipulators and one or more respective power source.

The power source can be a rechargeable electric battery. The battery can be charged wirelessly (i.e., by induction) or through an electric socket.

The electric battery can be removable from the housing.

The manipulable lever can be spring biased into one or two directions.

According to a second aspect of the present disclosure there is a power machine configured with a gear transmission, said gear transition comprising an input shaft and a coaxial output shaft, a planetary gear assembly configured with a sun gear fixedly articulated to the input shaft, a ring gear of the planetary gear assembly fixedly articulated at a hub of a transmission plate, said transmission plate configured with a peripheral gear ring; a gear ratio changing mechanism comprising a pinion gear engaged with the peripheral gear ring of the transmission plate and rotatable about a radial axis, and a transmission pinion gear rotatably articulated with the pinion gear; said transmission pinion gear being displaceable along the radial axis and configured for engaging with a rotatable gear plate; said gear plate is coaxially articulated with the output shaft and the gear plate is configured at an inside face thereof with a plurality of coaxially disposed gear rings, wherein the transmission pinion gear is engageable with a gear ring of gear plate, and wherein the gear ratio changing mechanism comprises a manipulator configured for selective radial displacing the transmission pinion gear between gear rings of the gear plate, and wherein one of the input shaft and the output shaft is connectable to a rotating power source and the other one of the input shaft and the output shaft is connectable to a rotating driven power unit.

According to a third aspect of the present disclosure there is a bicycle configured with a gear transmission, the gear transmission comprising an input shaft and a coaxial output shaft, a planetary gear assembly configured with a sun gear fixedly articulated to the input shaft, a ring gear of the planetary gear assembly fixedly articulated at a hub of a transmission plate, said transmission plate configured with a peripheral gear ring; a gear ratio changing mechanism comprising a pinion gear engaged with the peripheral gear ring of the transmission plate and rotatable about a radial axis, and a transmission pinion gear rotatably articulated with the pinion gear; said transmission pinion gear being displaceable along the radial axis and configured for engaging with a rotatable gear plate; said gear plate is coaxially articulated with the output shaft and the gear plate is configured at an inside face thereof with a plurality of coaxially disposed gear rings, wherein the transmission pinion gear is engageable with a gear ring of gear plate, and wherein the gear ratio changing mechanism comprises a manipulator configured for selective radial displacing the transmission pinion gear between gear rings of the gear plate, and wherein the input shaft is rotatably manipulable by a bicycle crank assembly and the output shaft is engageable with a rear hub assembly of a rear bicycle wheel.

According to a fourth aspect of the present disclosure there is a rear wheel for a bicycle configured with a gear transmission, the gear transmission comprising an input shaft and a coaxial output shaft, a planetary gear assembly configured with a sun gear fixedly articulated to the input shaft, a ring gear of the planetary gear assembly fixedly articulated at a hub of a transmission plate, said transmission plate configured with a peripheral gear ring; a gear ratio changing mechanism comprising a pinion gear engaged with the peripheral gear ring of the transmission plate and rotatable about a radial axis, and a transmission pinion gear rotatably articulated with the pinion gear; said transmission pinion gear being displaceable along the radial axis and configured for engaging with a rotatable gear plate; said gear plate is coaxially articulated with the output shaft and the gear plate is configured at an inside face thereof with a plurality of coaxially disposed gear rings, wherein the transmission pinion gear is engageable with a gear ring of gear plate, and wherein the gear ratio changing mechanism comprises a manipulator configured for selective radial displacing the transmission pinion gear between gear rings of the gear plate, and wherein the input shaft is configurable for rotation by a bicycle crank assembly and the output shaft is configurable for engaging with a rear hub assembly of the rear bicycle wheel.

In yet another aspect there is provided a gear transmission comprising a housing accommodating a gear ratio changing mechanism and having a central hub, a gear plate articulated to an output shaft coaxially rotatable about an axis of the central hub of the housing, the gear plate comprising a plurality of coaxially disposed gear rings selectively engaged by the gear ratio changing mechanism, a transmission plate coaxially rotatable about an axis of the central hub of the housing and having a peripheral gear ring coupled to the gear ratio changing mechanism, the gear ratio changing mechanism comprising: a pinion gear rotatably articulated with an axle and engaged with the peripheral gear ring of the transmission plate for transferring input rotary motion thereby received to the axle; a transmission pinion gear rotatable by the axle and being displaceable along the axle for engaging one of the coaxially disposed gear rings of the gear plate; and a manipulator configured for selective radial displacing the transmission pinion gear over the axle between gear rings of the gear plate The gear ratio changing mechanism is configured in some embodiments with a threaded rod rotatably disposed inside a cavity formed in the axle, wherein the transmission pinion gear is screw mounted on the threaded rod via one or more pass-through channels formed in the axle, whereby rotation of the threaded rod entails radial displacement of the transmission pinion gear over the axle. The gear ratio changing mechanism further comprises a mechanism for controllably manipulating rotary motion of the threaded rod, for adjusting the location of the transmission pinion gear over the axle. For example, in some embodiments, the gear ratio changing mechanism further comprises a (e.g., planetary) gear mechanism for coupling between the threaded rod the pinion gear at the extremity of the axle for controlling rotary motion of the threaded rod and thereby setting position of the transmission pinion gear over the axle.

The planetary gear assembly comprises several planetary pinion gears rotatably mounted on a carrier of the planetary gear assembly, said carrier being rotatably fixable to bicycle frame member. According to a particular configuration the carrier of the planetary gear assembly is fixable to the chainstay of the bicycle frame.

The overall width of the gear transmission is configured in some embodiments for mounting on a sprocket support of a hub assembly of a bicycle rear wheel.

The diameter of the gear transmission can be smaller than a diameter of a rear wheel of the bicycle.

The input shaft of the bicycle gear transmission can be rotatable by the crank assembly through a chain or a belt or a rod transmission.

Any one or more of the following features, designs and configurations can be applied to aspects of the disclosure, independently or in various combinations thereof:

- The transmission pinion gear can be coaxially rotatably articulated with the pinion gear;
- The transmission pinion gear can be displaceable along a radial axis offset with respect to the radial axis of the pinion gear, and rotatably articulated to the pinion gear;
- The transmission pinion gear can be displaceable along a non radial chord of the gear plate, and rotatably articulated to the pinion gear;
- The manipulable lever can be activated by an electrical power operated motor;
- The manipulable lever can be activated by a manual shifting mechanism;
- The manual shifting mechanism can be a gear shift cable;
- The carrier can be held in reaction by fixing it to an external frame member supporting the gear transmission;
- The gear transmission can be encapsulated within walls, rendering the gear transmission a sealed structure;
- A hub of the gear ring of the transmission plate can extend coaxial with the input shaft;
- The peripheral gear ring of the transmission plate can be a face gear wherein said gear ring extends coaxial with a rotating axis of the transmission plate;
- The peripheral gear ring of the transmission plate can extend coplanar with a plane of the transmission plate;
- The gear rings of the gear transmission can be of any type, e.g. spur gears, bevel gears, helical gears, spiral gears;
- The sun gear can be integral with the input shaft or integrated therewith;
- The ring gear can be integral with the transmission plate shaft or integrated therewith;
- The peripheral gear ring can be integral with the transmission plate or integrated therewith;
- The input shaft can be integral with the housing or integrated therewith;
- The gear transmission can be configured with two or more gear ratio changing mechanisms, each associated with a corresponding transmission pinion gear;
- The gear transmission can be configured with two or more transmission pinion gears, each rotatably articulated with a respective pinion gear;
- The gear transmission can be configured with two or more transmission pinion gears, each rotatably articulated on a radially extending axis and equi-radially spaced apart;
- The carrier of the planetary gear assembly can be held in reaction by articulating to a stationary element disposed outside of the gear transmission;
- The carrier of the planetary gear assembly can be held in reaction by magnetic articulation to an externally disposed stationary element;

The rotating axle carrying the transmission pinion gear and the pinion gear can have a polygonal cross section;

The gear plate can be configured with a gear shifting zone, wherein at a gear shifting zone the teeth of neighboring gear rings, are aligned along a radius of the gear plate;

The gear plate can be configured with two or more gear shifting zones, wherein two opposite gear shifting zones are disposed along a radius of the gear plate;

From both sides of each gear shifting zones a plurality of gear teeth are disposed, along a circular path of each gear ring, whereby the teeth along a circular path are gradually shifted, in a diverging and converging arrangement, where at the gear shifting zones all teeth of all gear rings are coaxial with no radial shift therebetween;

The teeth of the gear rings over the gear plate can have a substantially arced cross section, having a smooth tooth surface;

The transmission pinion gear can be configured with teeth having a shape complementary with the shape of the teeth of the gear rings, for smooth engagement therewith;

The transmission pinion gear is configured for substantial pure rolling over the teeth of the gear rings over the gear plate;

The length of the teeth of the transmission pinion gear can be greater that the height of the teeth of the gear rings of the gear plate, and wherein the gear plate is configured with openings at a root circle of the gear rings of the gear plate to facilitate penetration therethrough of the top land of the teeth of the transmission pinion gear;

Each tooth of a gear ring, other than the smallest gear ring and the largest gear ring, can be in contact with at least two neighboring teeth, one of a smaller gear ring and one of a larger gear ring;

The output shaft can be integrated with a sprocket support of a hub assembly of a bicycle rear wheel;

In motion: the axle supporting the transmission pinion gear rotates about its longitudinal axis and simultaneously rotates over the transmission plate together with housing in a direction opposed to the direction of rotation of the transmission plate, and/or the axle rotates about its longitudinal axis and simultaneously rotate about a central axis of the input shaft in the direction opposed to the direction of rotation of the transmission plate;

In motion, the transmission plate rotates in a direction opposite to rotation direction of the input shaft;

In motion, the output shaft plate rotates in a direction opposite to rotation direction of the input shaft.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A is a perspective front view of a gear transmission according to an example of the disclosure;

FIG. 1B is a longitudinal section along line 1B-1B in FIG. 1A;

FIG. 1C is a horizontal section along line 1C-1C in FIG. 1A;

FIG. 2A is a perspective rear view of the gear transmission of FIG. 1A;

FIG. 6G is a bottom perspective view of the portion seen in FIG. 6B;

FIG. 7C is an enlargement of the portion marked 7C in FIG. 7B;

FIG. 7D is yet an enlargement of a portion of the gear plate, from below;

FIG. 9A is an enlargement of the portion marked 9A in FIG. 1B, illustrating kinematics of the gear transmission;

FIG. 9B is an enlargement of the portion marked 9B in FIG. 2B, illustrating kinematics of the gear transmission;

FIGS. 14A to 14D schematically illustrate another possible embodiment of the transmission, wherein FIG. 14A is a back perspective view of the gear transmission, FIG. 14B is a front perspective view of the gear transmission, FIG.

14C is a back view of the transmission plate, and FIG. 14D is a sectional back perspective view showing internal component of the transmission;

FIGS. 15A to 15H schematically illustrate another possible embodiment of the transmission, wherein FIG. 15A shows a front perspective view of the transmission, FIG. 15B shows a back perspective view of the transmission, FIG. 15C shows a back perspective view of the transmission plate, FIG. 15D shows a back perspective view of the transmission without the gear plate, FIG. 15E shows a front perspective view of the internal housing, FIG. 15F shows a side perspective view of the axle, FIG. 15G shows a sectional view of the axle, and FIGS. 15H and 15I show cross-sections of the axle.

DETAILED DESCRIPTION OF EMBODIMENTS

Attention is first directed to the annexed drawings illustrating a gear transmission according to the an example of the disclosure, generally designated 20.

Figure 2B:
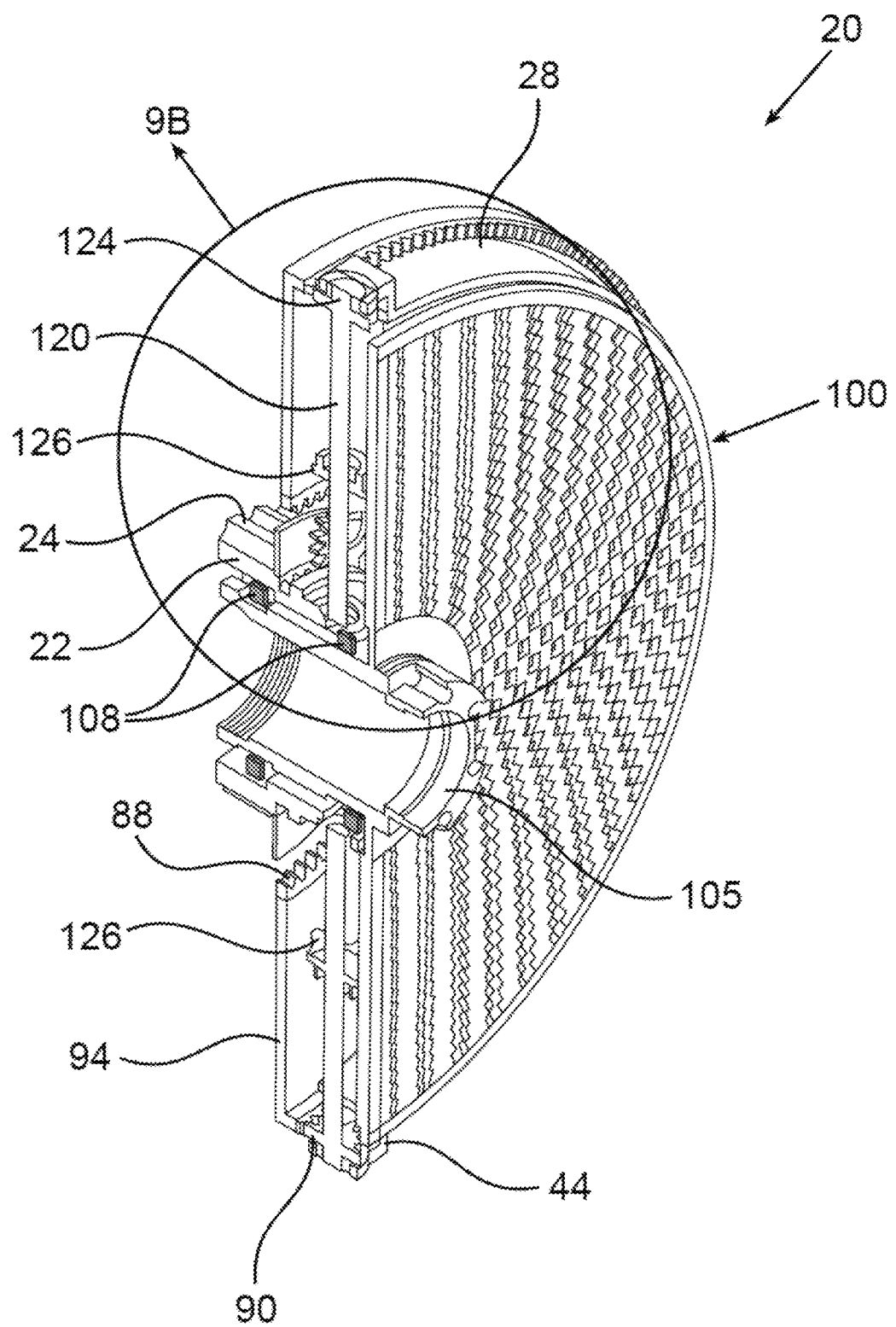
FIG. 2B is a longitudinal section along line 2B-2B in FIG. 2A.
Figure 3:
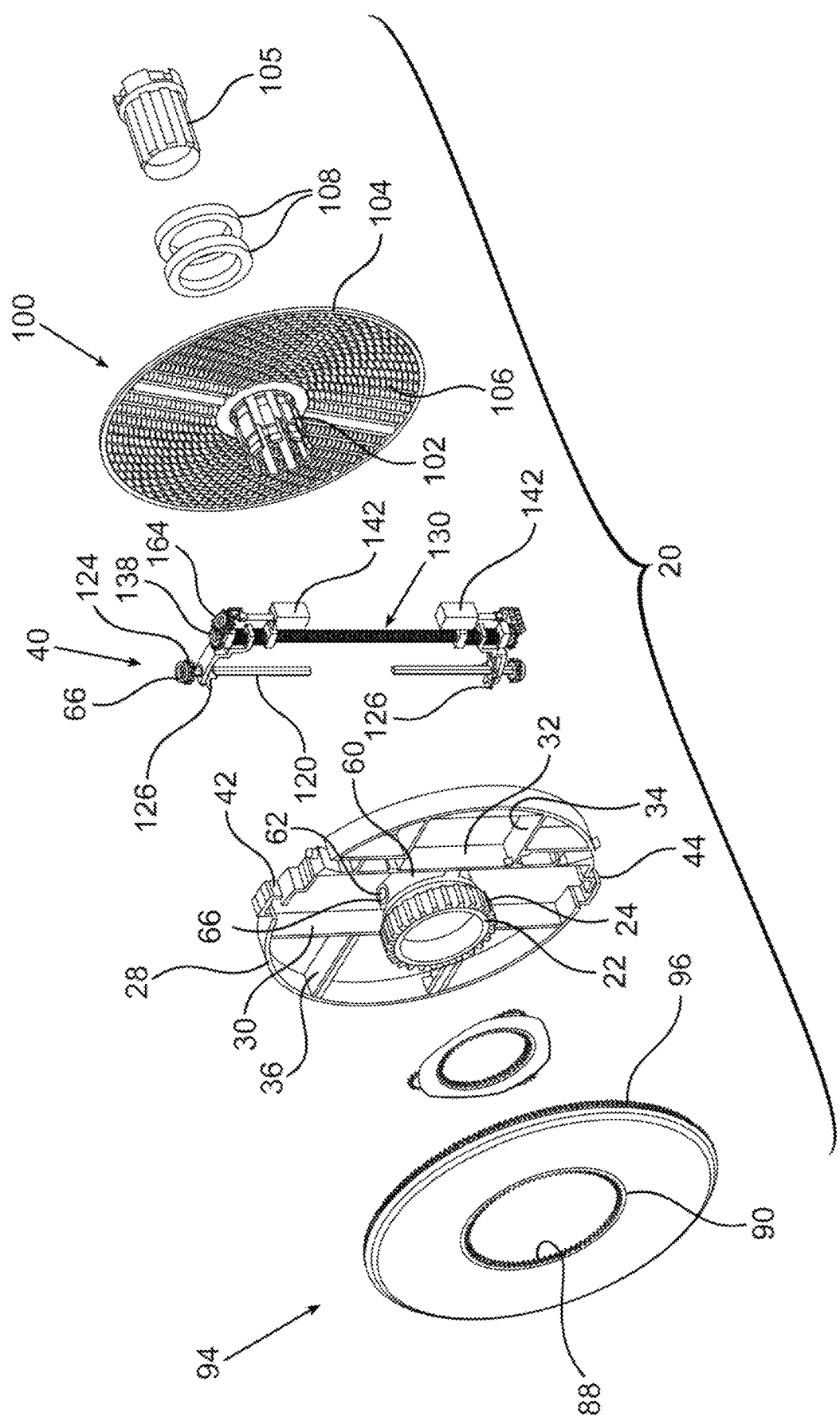
FIG. 3 is an exploded view of FIG. 1A.
Figure 10B:
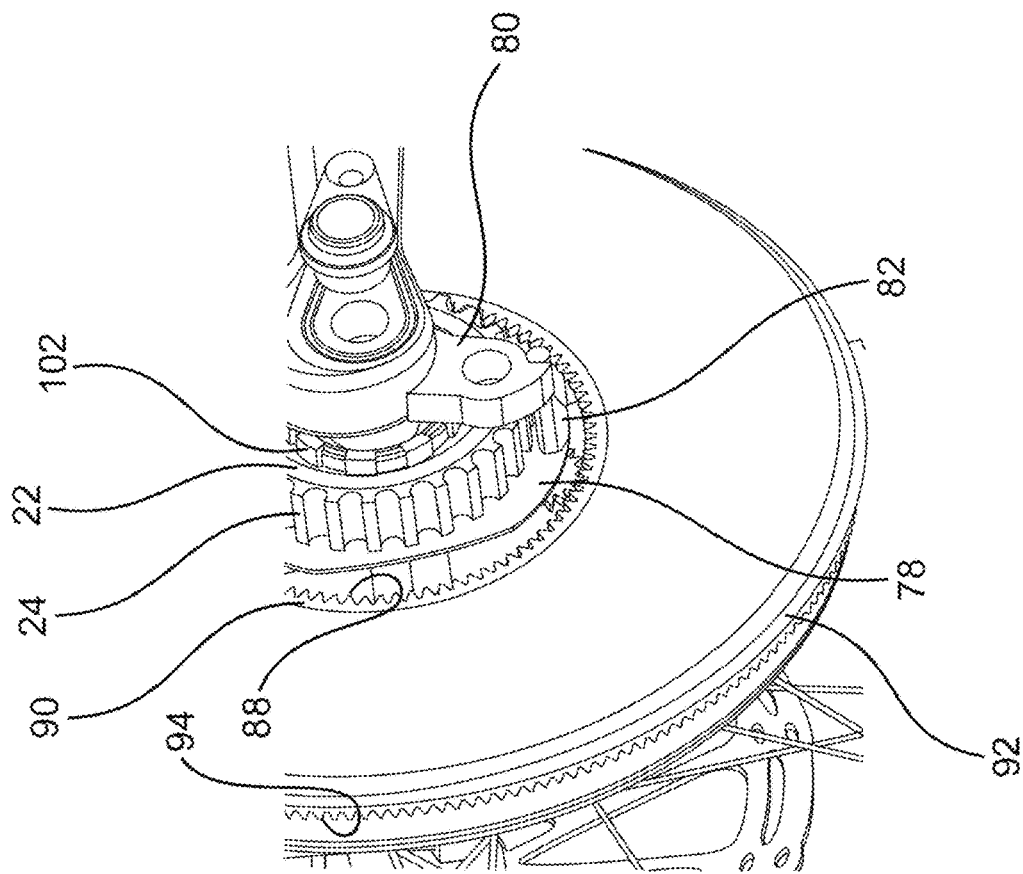
FIG. 10B is an enlargement of the portion marked 10B in FIG. 10A.
Figure 10A:
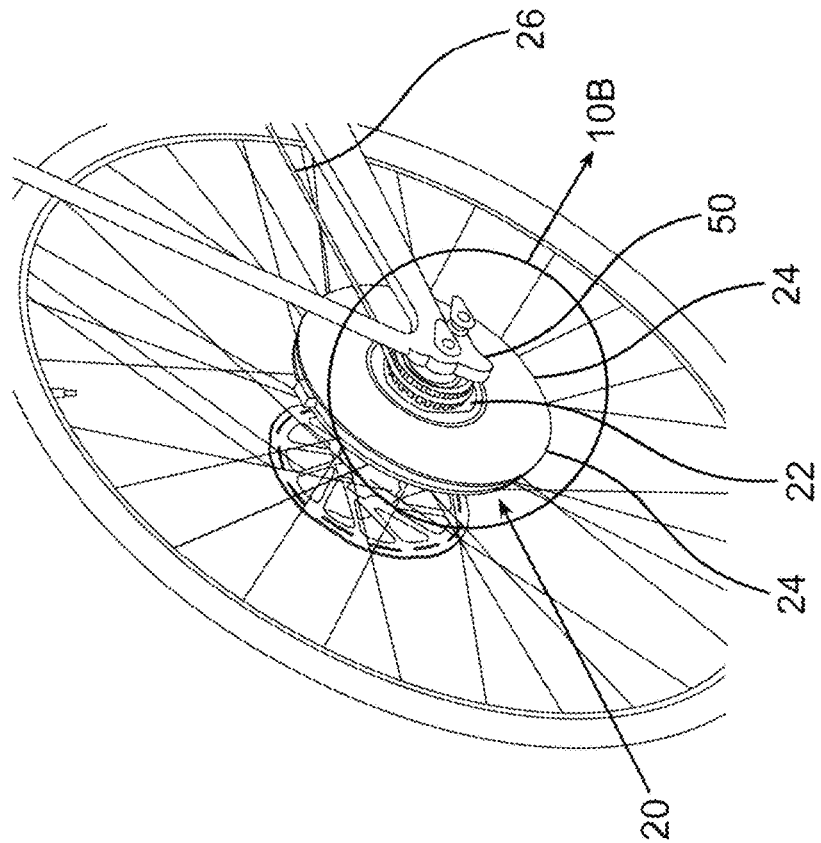
FIG. 10A is a rear, partial view, of a bicycle fitted with a gear transmission according to possible embodiments of the disclosure.

The gear transmission 20 comprises a cogged input shaft 22 configured with a plurality of cogs 24, such that the input shaft can be engaged for rotation by a belt or a chain 26 (FIG. 10A). The cogged input shaft 22 is integral with, or integrated with a housing 28 (seen isolated in the exploded views of FIGS. 3 and 4).

The housing 28 is basically a rigid ring-shaped member, compartmented by several partition walls, such as 30, 32, 34 and 36, wherein at an assembled position the compartments safely and securely accommodate components of a gear ratio changing mechanism (e.g., mechanism generally designated 40). The housing 28 is further configured at radially opposed peripheral locations, namely at the apex and at the nadir, with a top radial axle support 42 and a bottom radial axel support 44, respectively, wherein said radial axle supports 42 and 44 project outwardly from a perimeter of the housing 28. Further, the housing 28 is configured with two pinion gear supports 46 and 48, and two spur gear supports 52 and 54, disposed at cutaways of the housing 28 and extending at opposite ends of a chord, parallel to the diameter extending between the is radial axle supports 42 and 44.

It is further noted that a hub 60, of the housing 28, is configured with two openings 62 and 64 disposed in register with the radial axle supports 42 and 44 and configured for rotatably supporting respective ends of a the radial supports through bearings 66.

Figure 5B:
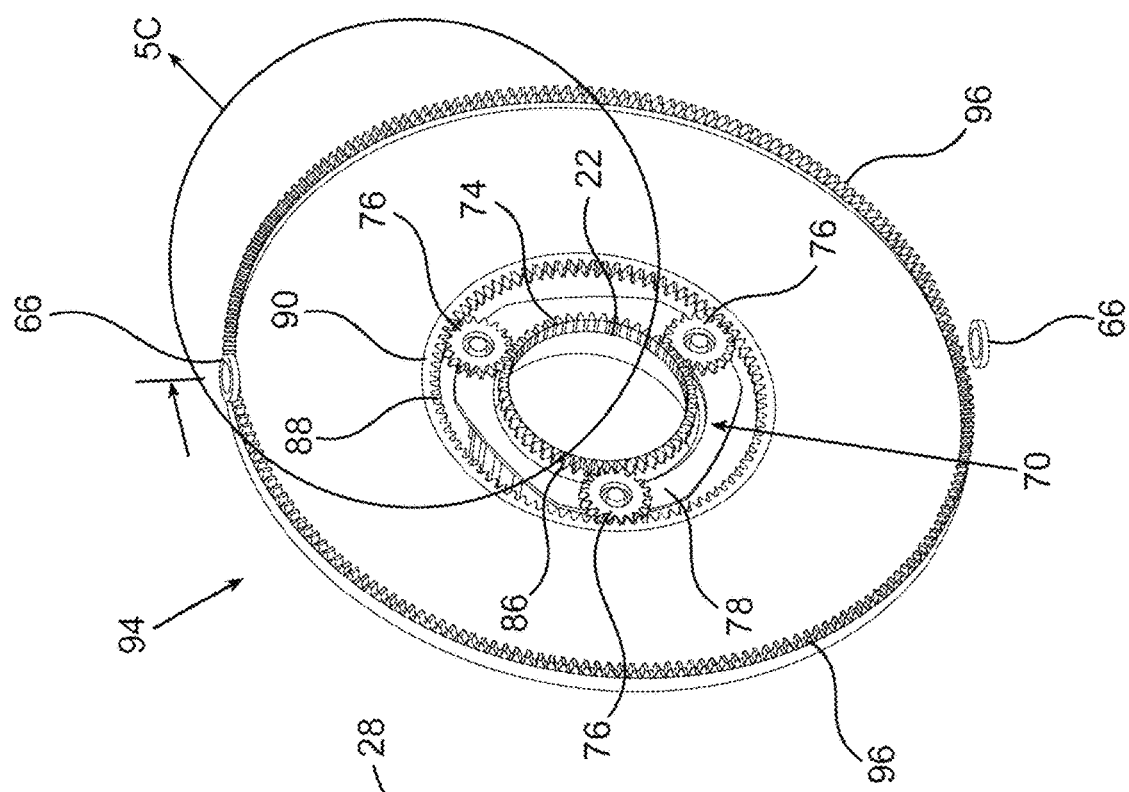
FIG. 5B is a perspective view of FIG. 5A with the housing and gear ratio changing mechanism removed, exposing the transmission plate and the planetary gear assembly.
Figure 5A:
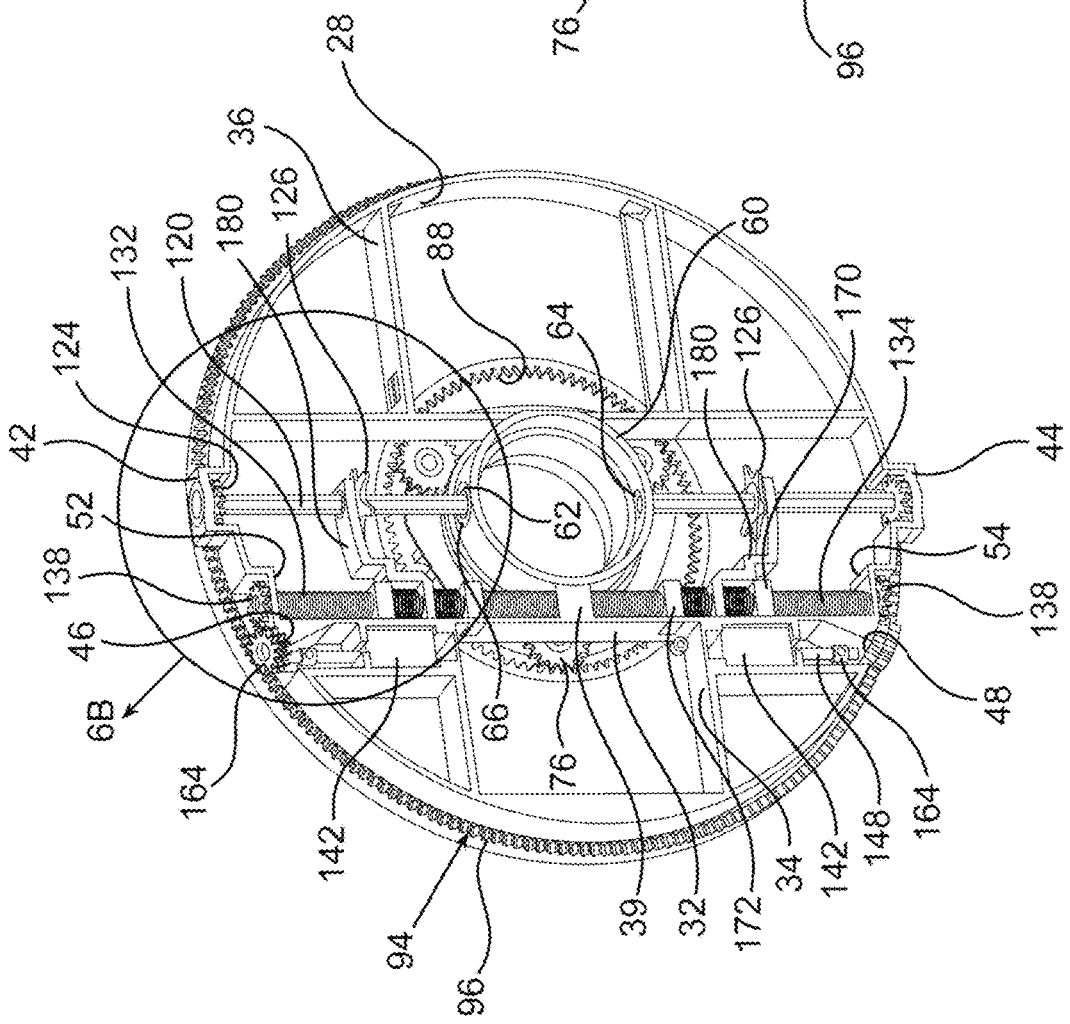
FIG. 5A is a perspective rear side view of the gear transmission, with the gear plate removed for exposing inside elements of the devise.
Figure 5D:
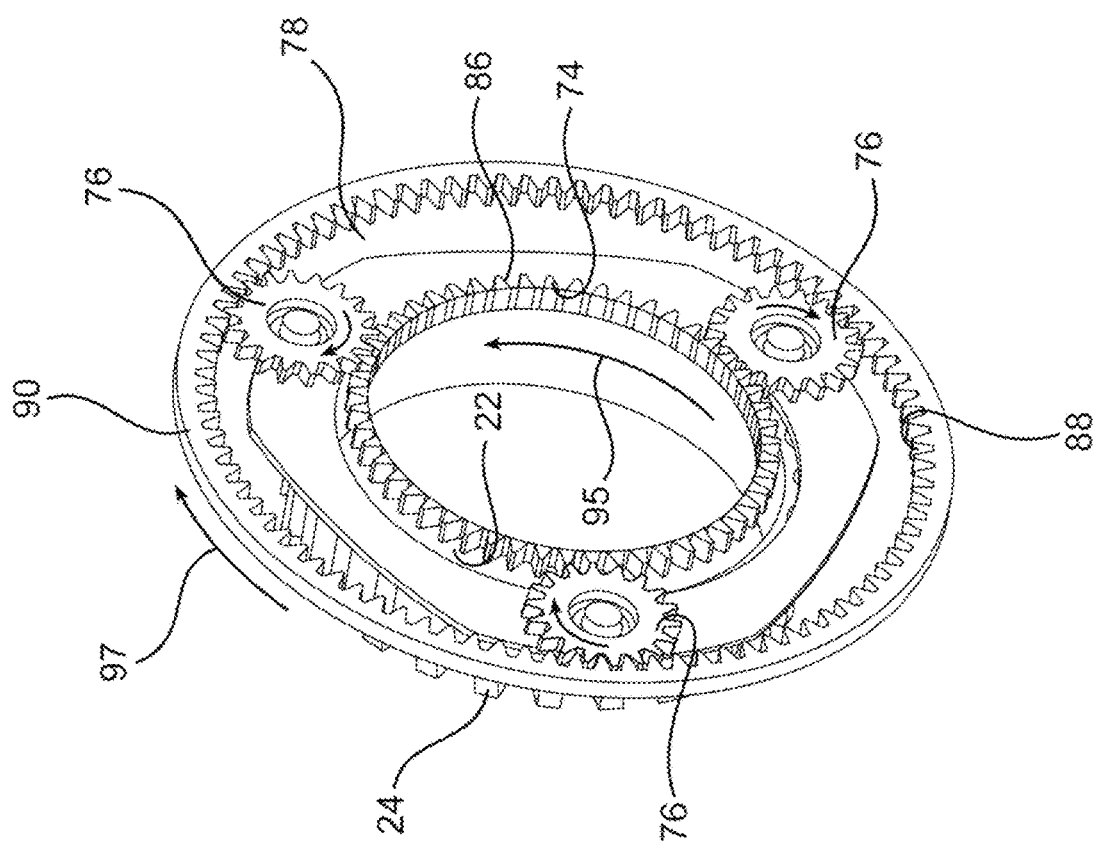
FIG. 5D is a perspective view of the planetary gear assembly.
Figure 5C:
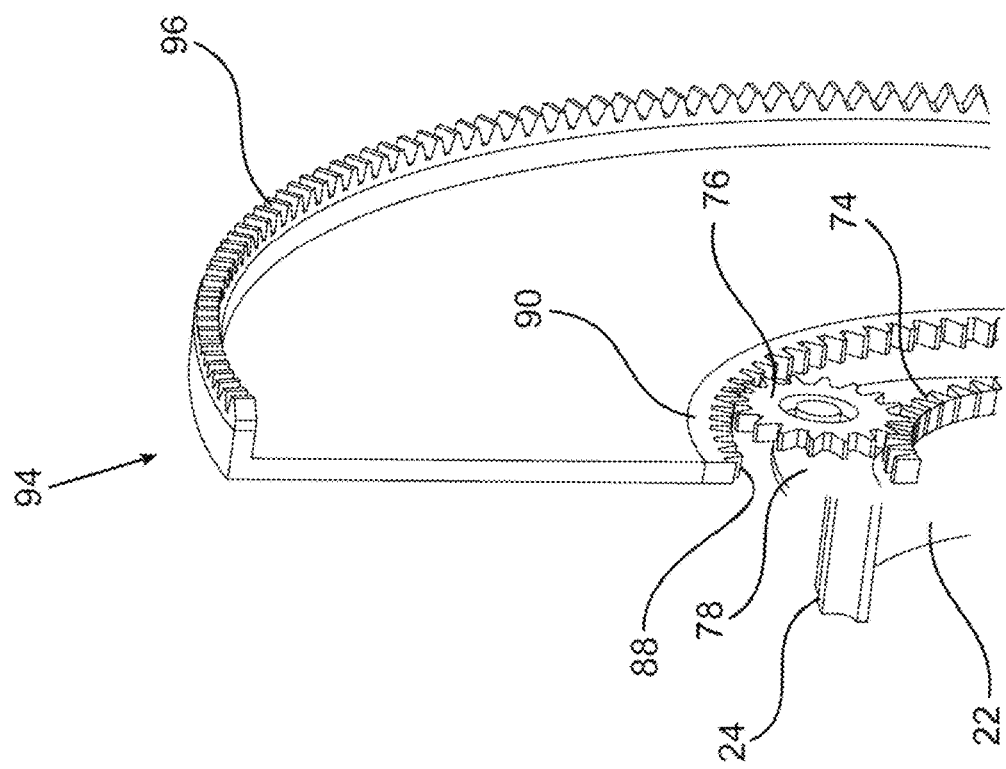
FIG. 5C is an enlargement of the portion marked 5C in FIG. 5B.

The gear transmission 20 further comprises a planetary gear assembly generally designated 70 shown in FIG. 5B and isolated in FIG. 5D, said planetary gear assembly 70 comprising a sun gear ring 74, integral with, or integrated with the input shaft 22 (i.e., such that rotation of the input shaft entails rotation of the sun gear 74), and several (three in the present example) planetary pinion gears 76 rotatably mounted on a carrier plate 78. The carrier plate 78 is rotatably fixed, i.e., held in reaction (e.g., by securing to an external frame portion, such as to a bicycle derailleur hanger 80, by arresting pin 82, as illustrated by way of example in FIGS. 10A and 10B). However, the carrier plate 78 can be fixed to a chainstay of the bicycle frame otherwise. Also, it is noted that the carrier plate 78 can be fixed by other arrangements, e.g., magnetic arresting, (not shown), etc.

The planetary pinion gears 76 are rotatably engaged with external teeth 86 of the sun gear 74 and with an internal geared ring gear 88 fixed at a hub 90 of a transmission plate generally designated 94, said hub 90 being integral or integrated with the transmission plate 94. The transmission plate 94 comprises at a periphery thereof a peripheral gear ring 96, wherein in the illustrated example the peripheral gear ring 96 is a face gear extending coaxial with a rotating axis of the transmission plate 94.

The arrangement of the planetary gear assembly 70 is such that the sun gear 74 serves as an input source, the pinion gears 76 rotate as idlers over the carrier plate 78 which is held in reaction, such that output rotation is received at the ring gear 88, whereby rotation of the sun gear 74 in one direction (e.g., as indicated by arrow 95 in FIG. 5D) entails rotation of the ring gear 88 at an opposite direction (as indicated by arrow 97), as will be exemplified hereinafter.

As can be seen, best in FIGS. 7A to 7F a rotatable gear plate generally designated 100 has an output shaft 102 integral or integrated with a gear plate portion 104, wherein at the present example the output shaft 102 is configurable for rotation engaging with a rear hub assembly of a rear bicycle wheel i.e., with a sprocket support 105 of a hub assembly (not shown). The gear plate portion 104 is configured at an inside face thereof 106 with a plurality (twenty in the illustrated example) of coaxial gear rings designated $110_1$ to $110_{20}$. In the illustrated example the smallest gear ring $110_1$ comprises 18 teeth, and the largest gear ring $110_{20}$ comprises 60 teeth (each gear ring comprises 2 teeth more than a neighboring smaller gear ring).

As can be seen, a pair of bushings/bearings 108 are disposed between the output shaft 102 of the rotatable gear plate 100 and the input shaft 22, such that they are free to rotate with respect to one another.

The gear plate 100 is configured with two oppositely disposed gear shifting zones 112T and 112B, axially extending over a diameter of the gear plate 100, wherein from both sides of each gear shifting zones a plurality of gear teeth are disposed, along a circular path of each gear ring $110_1$ to $110_{20}$, whereby the teeth along a circular path are gradually shifted, i.e., $\alpha_i < \alpha_{ii} < \alpha_{iii}$ (FIGS. 7D and 7E), in a diverging and converging arrangement, where at the gear shifting zones 112T and 112B all teeth of all gear rings are coaxial with no radial shift therebetween. It is however appreciated that any one or more gear shifting zones can be configured, each of which disposed over a radii of the gear plate 100.

Figure 7B:
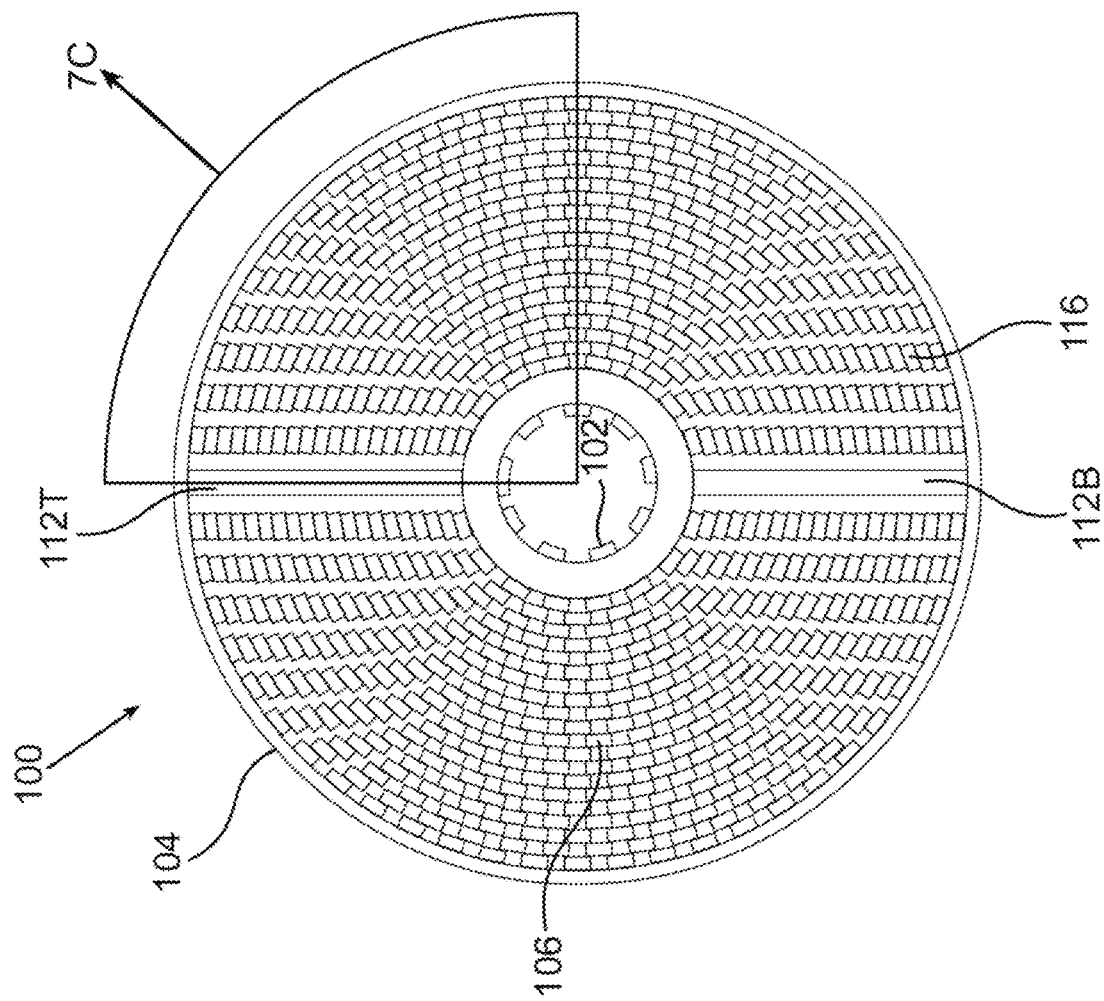
FIG. 7B is a planar view of FIG. 7A.
Figure 7A:
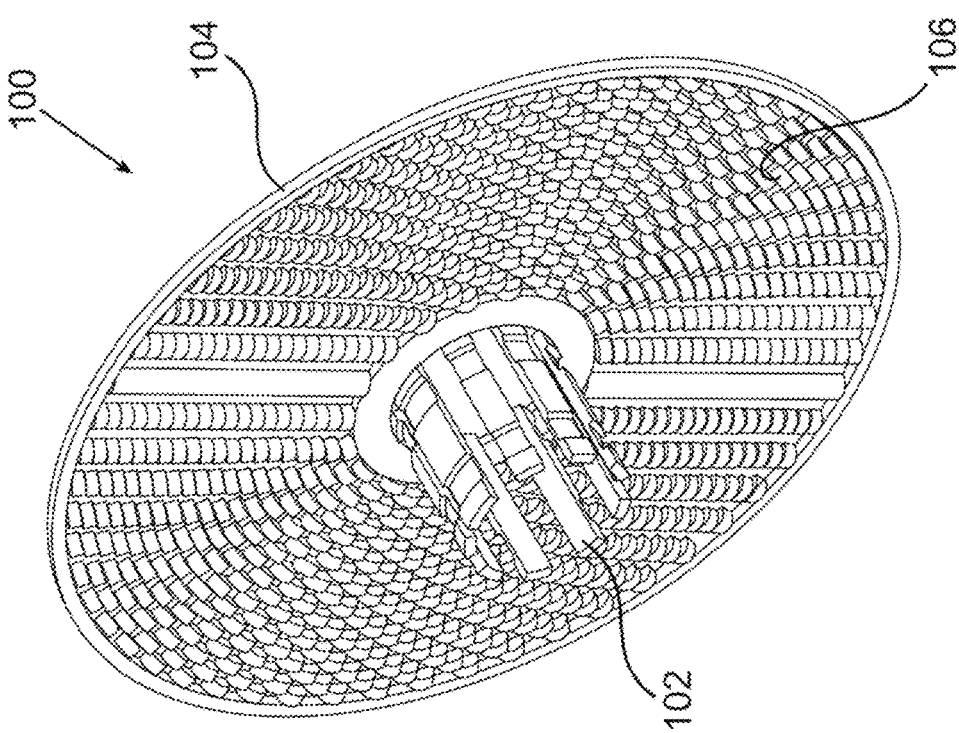
FIG. 7A is an inside perspective view of the gear plate.
Figure 7F:
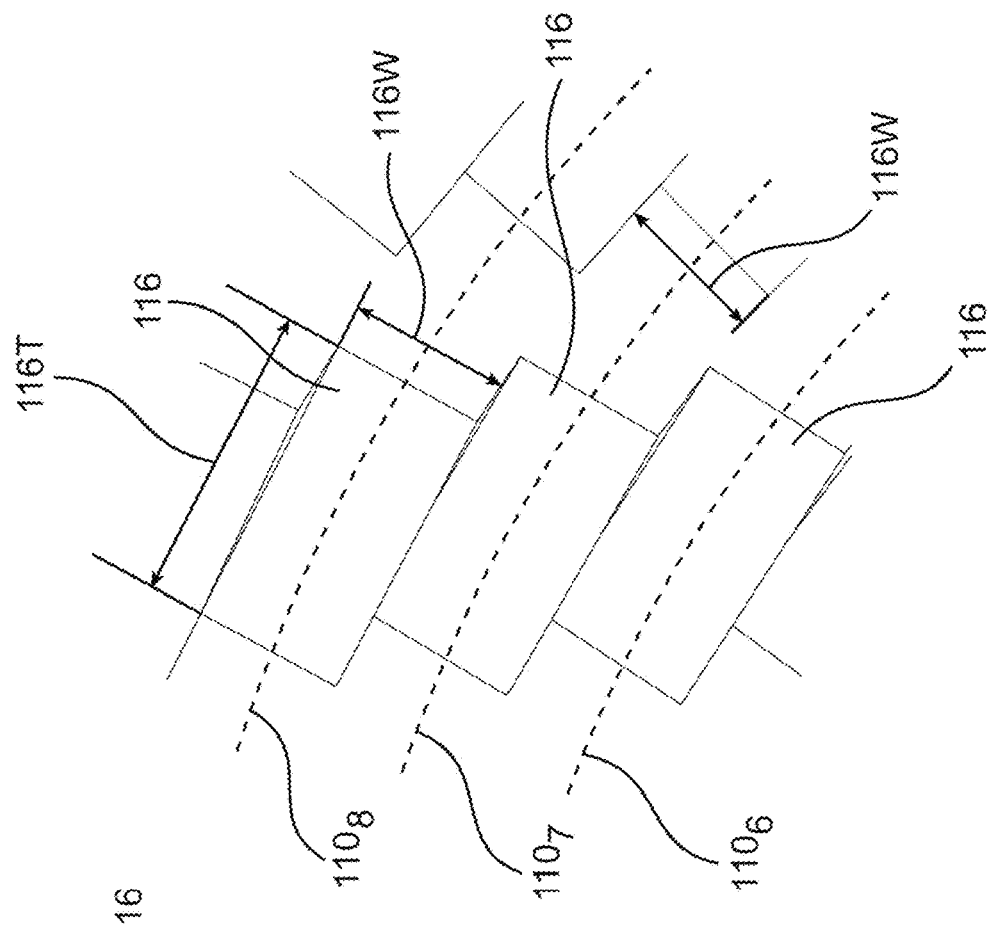
FIG. 7F is a zoom-in of the portion marked 7F in FIG. 7C.
Figure 7E:
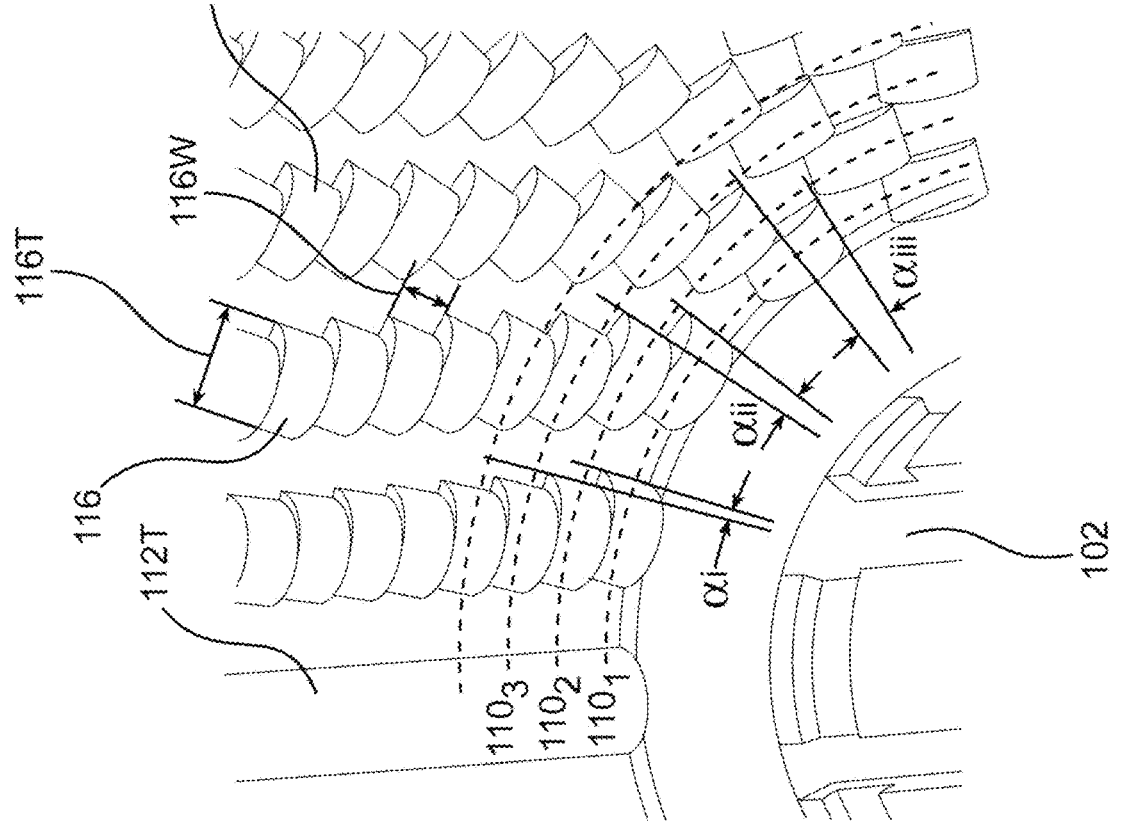
FIG. 7E is a perspective top view of the portion illustrated in FIG. 7D.

As can be seen, best in FIGS. 7D to 7F, the teeth 116 of all the gear rings $110_1$ to $110_{20}$ are substantial similar and are configured with a substantially arced cross section face projecting from the inside face of the gear plate portion 104, all having a smooth, continuous tooth surface, identical face width $116w$, identical face thickness $116_T$ and identical spacing between the teeth (FIG. 7F). It is however appreciated that other shapes of face gear teeth are configurable, without departing from the scope of the disclosure.

Figure 6A:
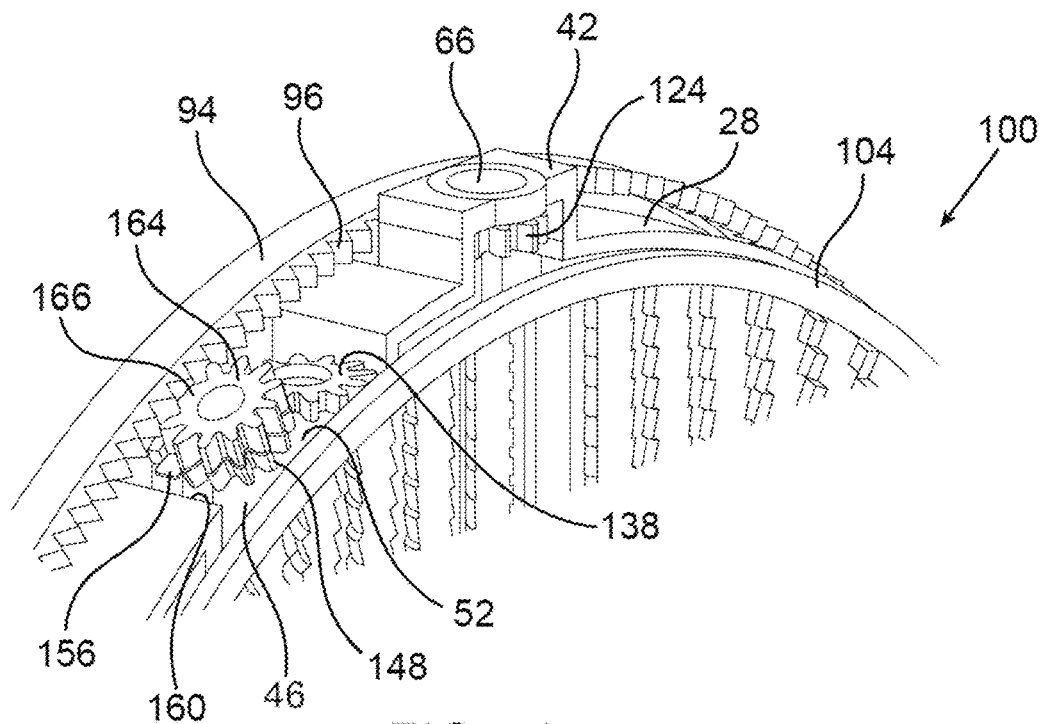
FIG. 6A is an enlargement of the portion marked 6A in FIG. 2A.
Figure 6B:
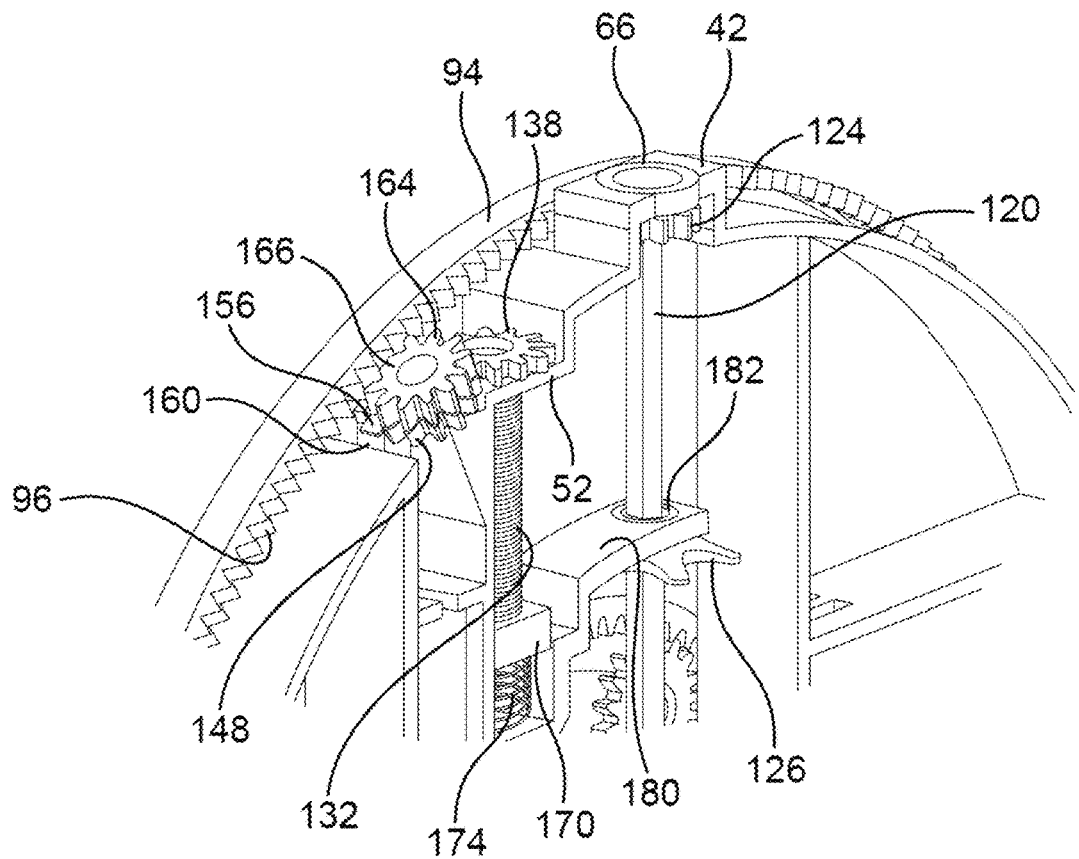
FIG. 6B is an enlargement of the portion marked 6B in FIG. 5A.
Figure 6C:
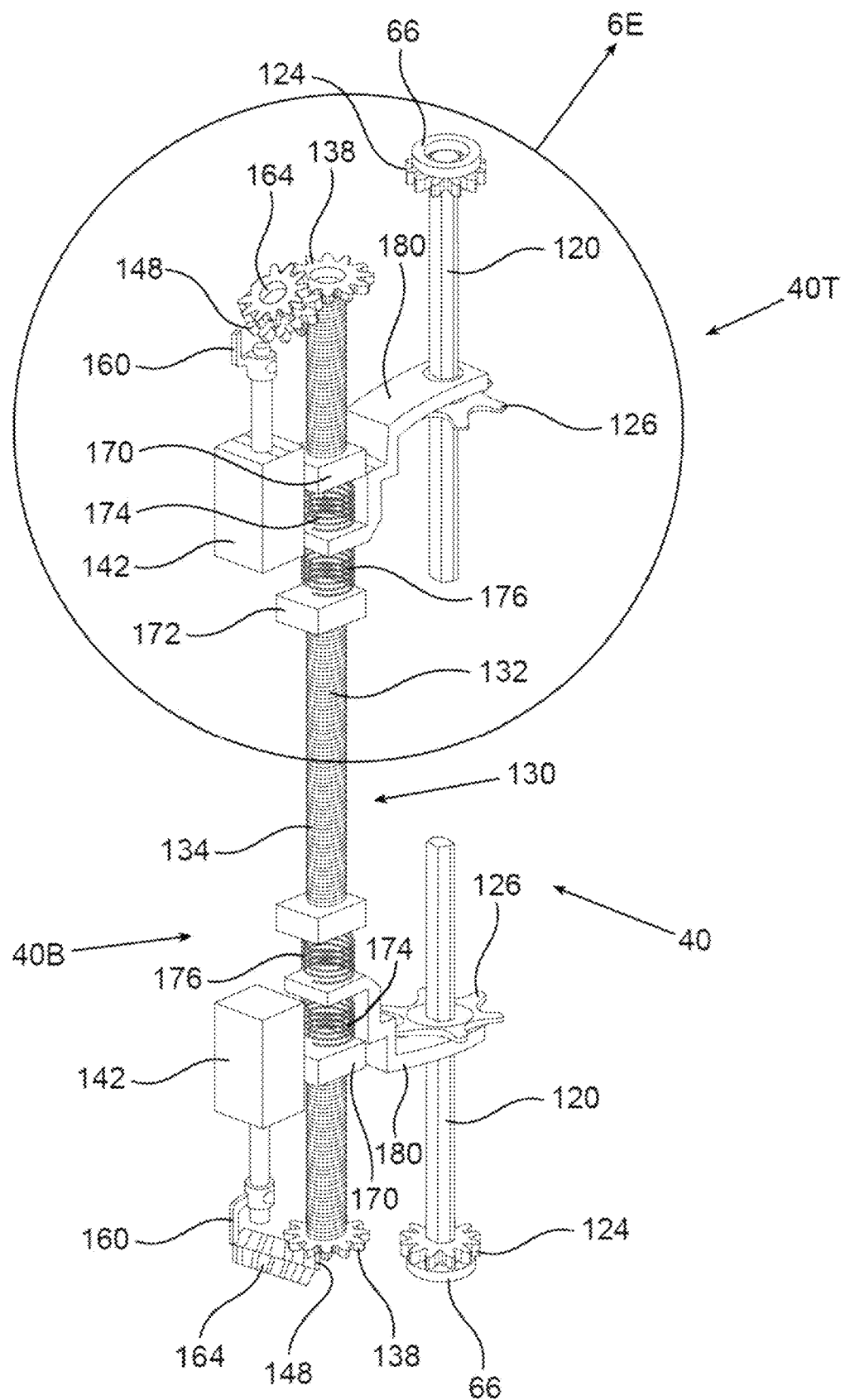
FIG. 6C is a perspective view of a gear ratio changing mechanism according to an example of the disclosure.
Figure 6E:
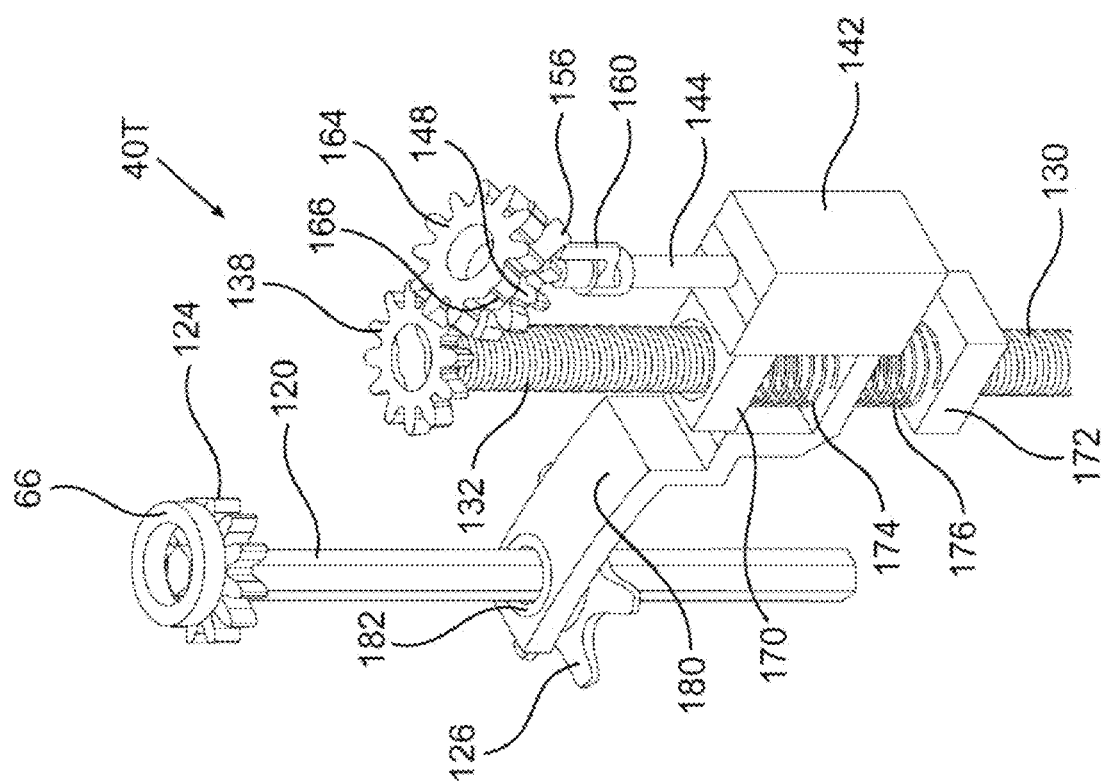
FIG. 6E is an opposite side perspective view of the portion marked 6E in FIG. 6C.
Figure 6D:
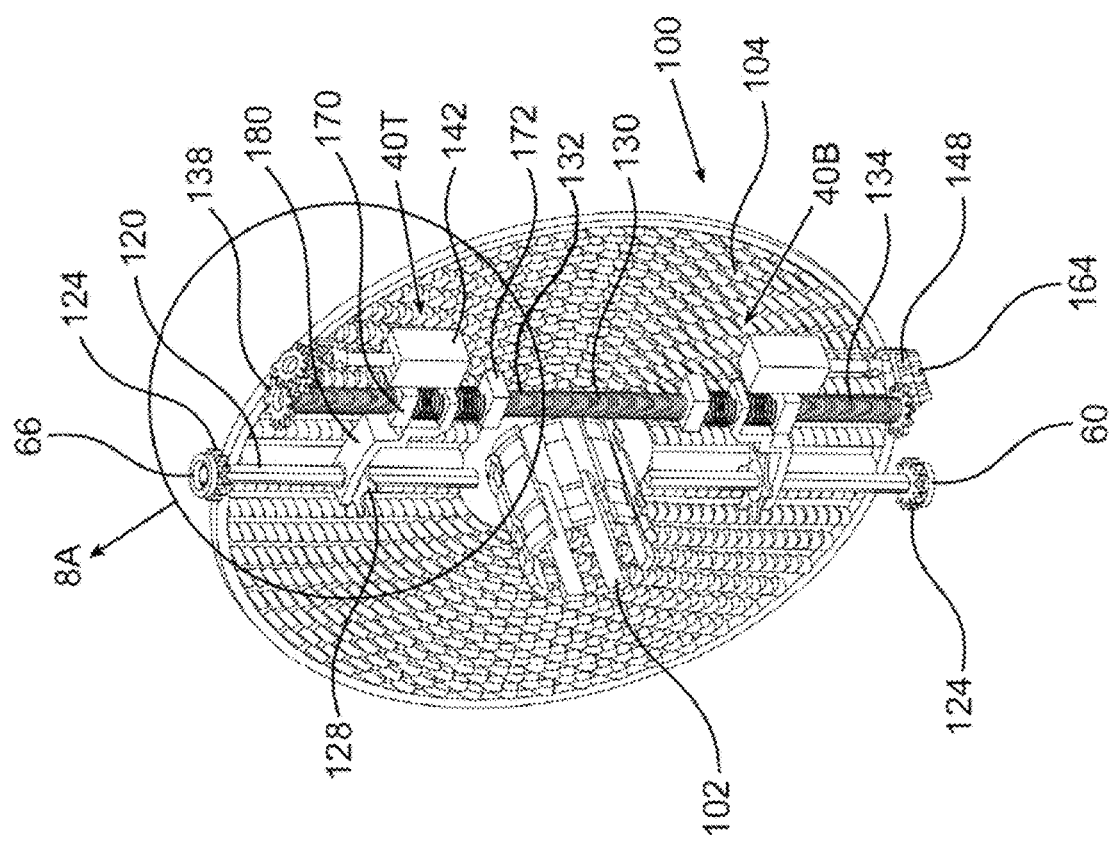
FIG. 6D is a perspective front side view of the gear transmission, with the transmission plate removed for exposing inside elements of the devise.

Turning now to an example of the gear ratio changing mechanism 40, it is seen that it comprises a pair of oppositely disposed sub-assemblies, namely a top sub-assembly and a bottom sub-assembly, designated 40T and 40B in FIG. 6C, respectively. The two sub-assemblies are identical and operate in conjunction with one another and are fully synchronized with one another, configured so as to transfer rotary motion from the transmission plate 94 to the gear plate 100, at selected gear ratios, as will be disclosed herein below, wherein one of the sub-assemblies is in charge of gear upshifting and the other one of the sub-assemblies is in charge of gear downshifting.

For sake of clarity, the description is directed to the top sub-assembly 40T, however be it clear that the bottom sub-assembly 40B is identical though disposed upside down and operates at a revers sense. Also, it is appreciated that a gear transmission can assume other configurations, as will be exemplified hereinafter.

The top gear ratio changing mechanism sub-assembly 40T comprises a polygonal axle 120 (hexagonal in the present example) rotatably supported at a radial distal end thereof by the top radial axle support 42 of the housing 28, and at a radial proximal end thereof within the opening 62 at the hub of the housing 28, wherein both axle supports 42 and 62 are configured with a bearing 66 for smooth rotary support of the hexagonal axle 120. A pinion gear 124 is rotatably secured at a top (radial distal end) of the hexagonal axle 120 and is constantly engaged with the peripheral gear ring 96 of the transmission plate 94. A transmission pinion gear 126 is axially displaceable along the hexagonal axle 120 though rotatably fixed thereto, whereby it is rotatably articulated with the pinion gear 124, i.e., are both configured for rotating along the longitudinal axis of the axle 120.

Figure 8A:
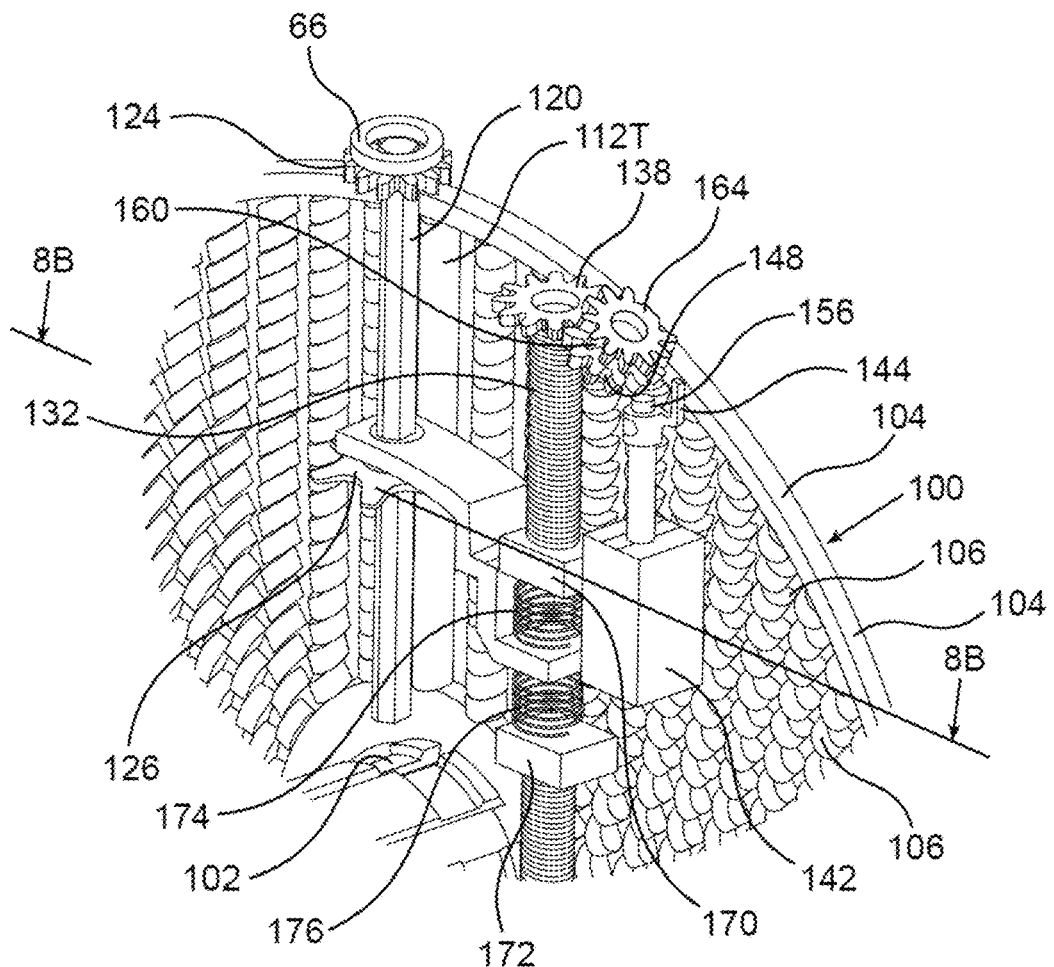
FIG. 8A is an enlargement of the portion marked 8A in FIG. 6D.
Figure 8B:
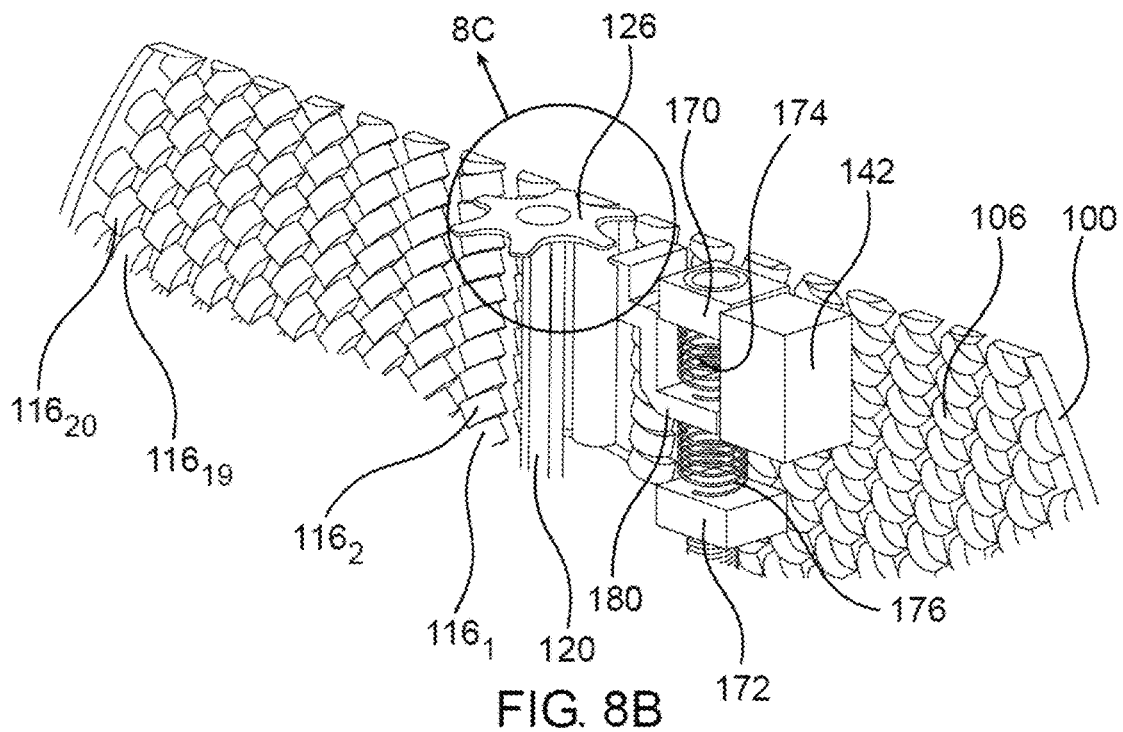
FIG. 8B is a section taken along line 8B-8B in FIG. 8A.
Figure 8C:
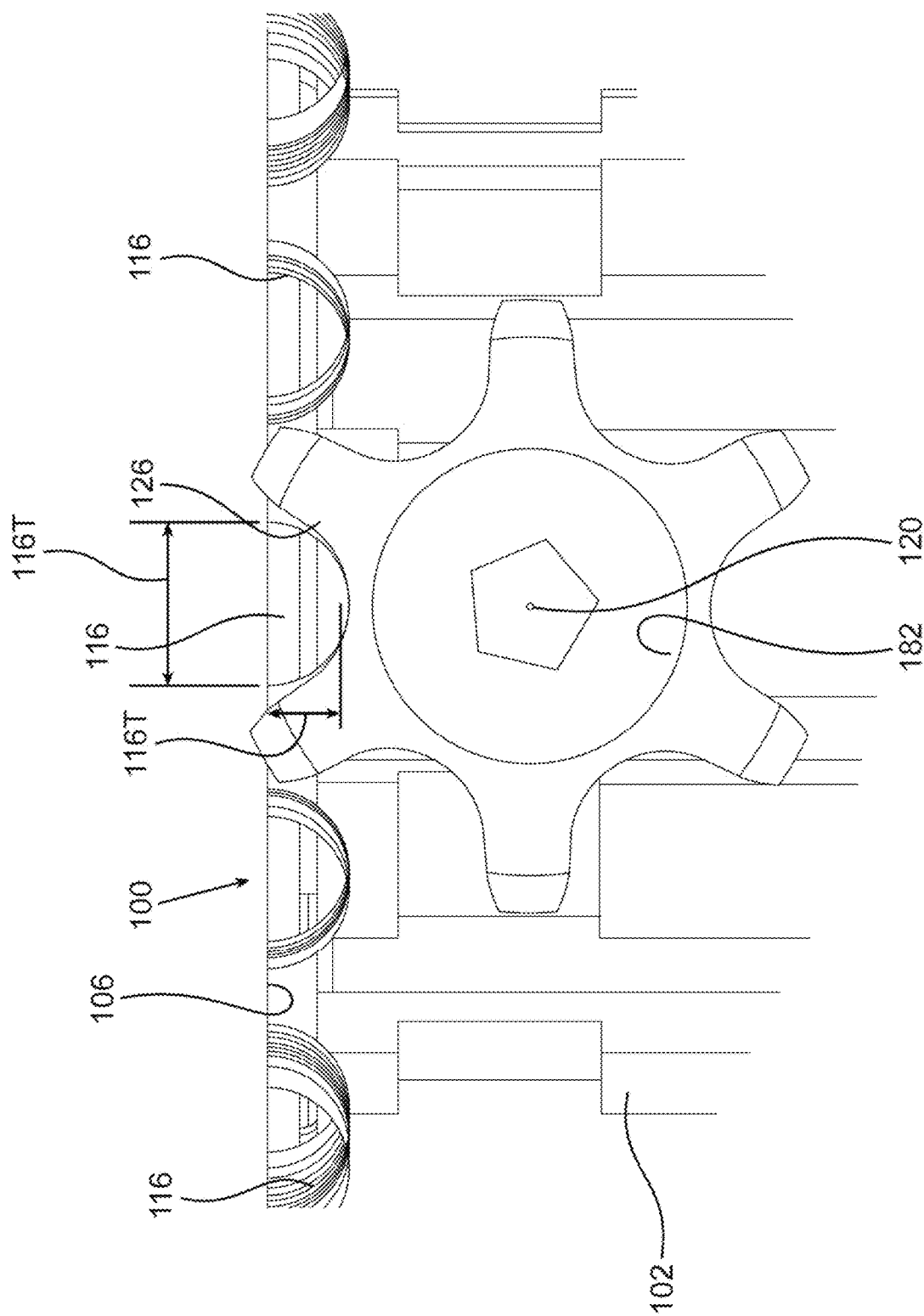
FIG. 8C is an enlarged top view of the portion marked 8C in FIG. 8B.

The shape and size of the transmission pinion gear 126 is configured for engaging with the teeth 116 of any of the gear rings $110_1$ to $110_{20}$, as will be explained herein below with reference to FIGS. 8A to 8C.

The top gear ratio changing mechanism sub-assembly 40T further comprises a threaded rod 130 rotatably secured at proximal ends by supports 52 of the housing 28, and within a support bushing 39 at a mid-portion of the housing 28. Noting that the gear ratio changing mechanism 40 comprises a top sub-assembly 40T and a bottom sub-assembly 40B, the threaded rod 130 is common and thus the direction of the threading over the top portion 132 is opposed with respect to the bottom portion 134 of the threaded rod 130. At the distal end of the top threaded portion 132 there is mounted a manipulating pinion gear 138 which at the assembled position is disposed external over the spur gear support 52 of the housing 28. Thus, the arrangement is such that the top sub-assembly 40T and the bottom sub-assembly 40B operate in opposite senses, i.e., in mirror-like sense, eventually resulting in that the transmission pinion gears 126 of the two sub-assemblies move towards one another or away from one another.

A solenoid 142 is secured between supporting partition walls within the housing 28, and is electrically coupled to a power source (rechargeable battery) and a CPU, received within the housing (both seen in the configuration of FIG. 12) and controlled by a user interface, e.g., a remote-operated gear-shift control (not shown). The solenoid 142 is configured for axial displacing a shaft 144, between a normally projecting position and a momentarily retracted position. It is appreciated however, that the solenoid of top sub-assembly 40T and the bottom sub-assembly 40B are each responsible of either gear upshift or gear downshift, as will be explained.

Figure 6F:
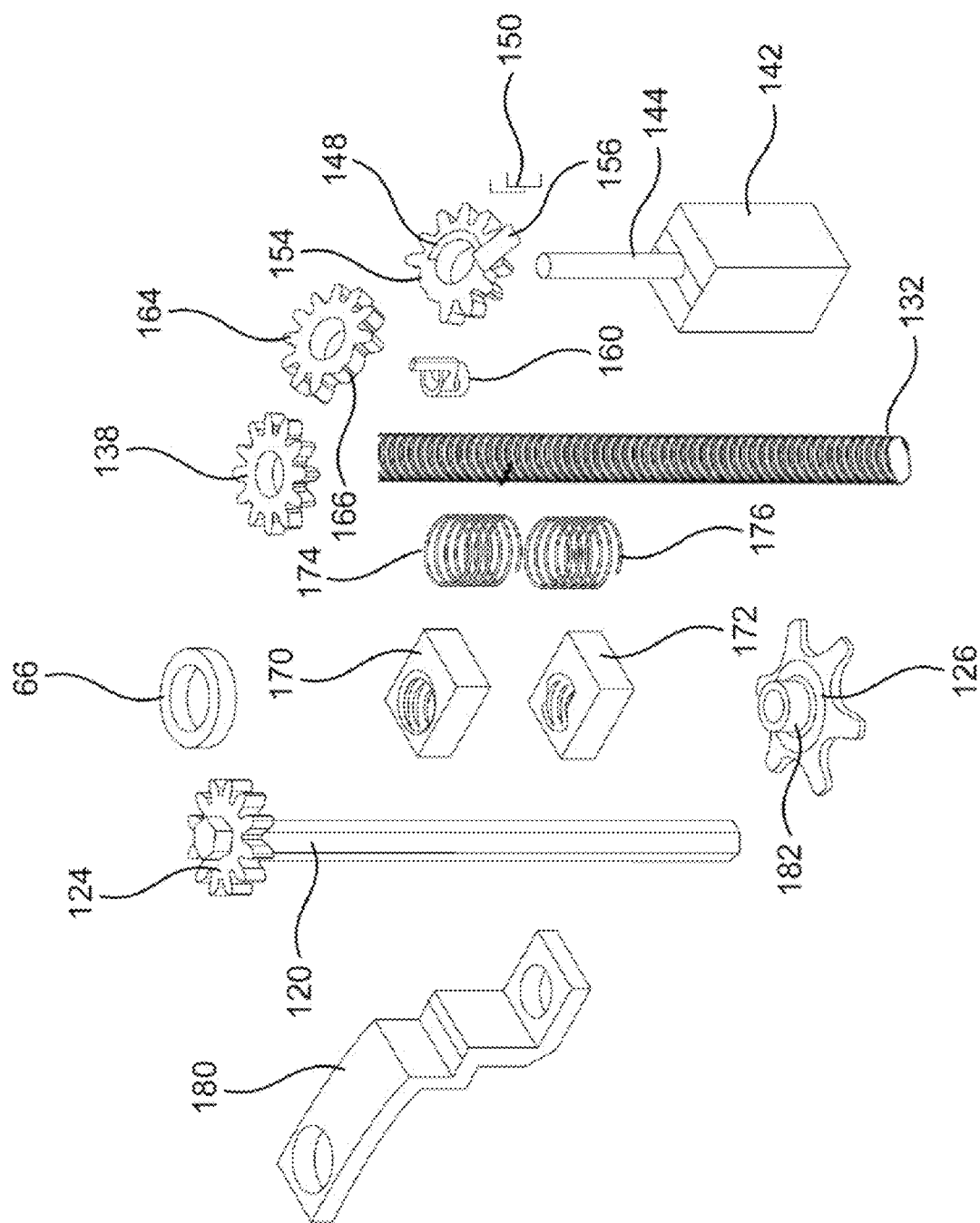
FIG. 6F is an exploded view of FIG. 6C.

A first gear cog 148, substantially identical with manipulating pinion gear 138, is rotatably fixed to the housing 28 at pinion gear support 46, where said first gear cog 148 is biased into clockwise rotation by a biasing leaf spring 150 (FIGS. 6F and 6G) fixed at 152 to the pinion gear support 46, and wherein said first gear cog 148 is missing several teeth at 154 (FIG. 6F) and comprises a lateral latch 156 arrestable by an arresting arm 160 fixed on shaft 144 of solenoid 142 as will be explained herein below. The first gear cog 148 is engaged with the manipulating pinion gear 138. At a normal, rest position, when the lateral latch 156 is arrested by the arresting arm 160, the first gear cog 148 is disposed such that the missing teeth portion faces the manipulating pinion gear 138, such that no interaction takes place therebetween.

A second gear changing pinion gear 164 is integral or integrated with the first gear cog 148, generating a rotating pair, said second gear changing pinion gear 164 is also missing several teeth at 166 (FIG. 6F), though angularly shifted from missing teeth of first gear cog 148, and wherein said second gear changing pinion gear 164 is engaged with the peripheral gear ring 96 of the transmission plate 94. At a normal, rest position, when the lateral latch 156 is arrested by the arresting arm 160, the second gear changing pinion gear 164 is disposed such that the missing teeth portion faces the peripheral gear ring 96, such that no interaction takes place therebetween.

A pair of nuts (first nut 170 and second nut 172) are screw mounted on the threaded rod 132 with a pair of coiled compression sprigs 174 and 176 disposed therebetween. A first end of a manipulator, in the form of a manipulator lever (gear transmission lever 180) is mounted on the threaded rod 132 between the two coiled compression sprigs 174 and 176, with an opposite end of the manipulator (gear transmission lever 180) rotatably holding the transmission pinion gears 126 through a bearing 182.

Operation of the gear ratio changing mechanism 40 is as follows. Once it is required to change gear, a command signal (upshift or downshift) is generated (e.g., by an individual) to the CPU which in turn generates a control signal to the respective solenoid 142 of one of the top sub-assembly 40T and the bottom sub-assembly 40B, to momentarily retract once. It is appreciated that upshift causes the transmission pinion gear 126 to radially displace inwards towards a smaller gear ring $110_i$ (e.g., i=1, 2, 3, . . . , 20) of the gear plate 100, and downshift causes the transmission pinion gear 126 to radially displace outwards, towards a larger gear ring $110_i$ of the gear plate 100.

Assuming a gear upshift command is generated, the CPU thus generates a respective signal to the solenoid 142 of the top sub-assembly 40T to momentarily retract, thus enabling the biased first gear cog 148 together with the second gear changing pinion gear 164 fixed thereto to rotate in a clockwise direction, such that the geared portion of the second gear changing pinion gear 164 engages with the peripheral gear ring 96 of transmission plate 94, causing the second gear changing pinion gear 164 to complete a revolution with corresponding revolution of the first gear cog 148 and resultant revolution of the manipulating pinion gear 138 and the rod 130 articulated thereto (in a counter clockwise direction).

Each revolution of the threaded rod 130 entails axial displacement of the respective first nut 170 and second nut 172 downwards (radially inwards), resulting in corresponding downwards (radially inwards) displacement of the manipulator (gear transmission lever 180), with the transmission pinion gear 126 articulated thereto and displacing radially inwards too, into engagement with a smaller gear ring. An additional upshift command will result in additional sequence of operations as above and a prolonged upshift command will result in generating consecutive upshift signal, such that gear ration may be upshifted by several ratios.

Gear downshift takes place however rather than generating a control signal to the solenoid 142 of the top sub-assembly 40T, it will be generated by the CPU to the bottom sub-assembly 40B, mutatis mutandis.

Noticeably, when a shift signal is generated to the solenoid 142 of one of the top sub-assembly 40T and the bottom sub-assembly 40B, the solenoid of the other one of the top sub-assembly 40T and the bottom sub-assembly 40B remains idle, so that the manipulating pinion gear does not engage with the peripheral gear ring 96, so as not to interfere in operation of the one sub-assembly, respectively, and vice versa. For that purpose, when the first gear cog 148 is at rest position the missing teeth portion faces the manipulating pinion gear 138. However, when the threaded rod 130 revolves, owing to gear meshing of lateral latch 156 with manipulating pinion gear 138, it causes the transmission pinion gears 126 of both the top sub-assembly 40T and the bottom sub-assembly 40B to axially displace in a mirror fashion (towards one another or away from one another), regardless which of the top sub-assembly 40T and the bottom sub-assembly 40B was activated. As explained hereinbefore, this occurs since the threaded rod 130 is a solid unit (consisting of top portion 132 and bottom portion 134, which however have an opposite thread).

At an assembled position, the gear plate 100 is rotatably secured to the housing 28, prevented from axial detaching, whereby the output shaft 102 is supported by the wheel ratchet 105 and the housing 28 is supported over bushings/bearings 108. At the assembled position the two transmission pinion gears 126 are meshed with teeth of one of the gear rings $110_1$ to $110_2$. (FIGS. 8A to 8C), whereby the gear kinematics are explained with reference to FIGS. 9A and 9B. As rotary motion is imparted to the input shaft 22 in direction of arrow 190, (as well as to sun gear ring 74) the pinion gears 76 rotate in an opposite direction (arrow 192) and the internal geared ring gear 88 of transmission plate 94 rotates in the same direction (arrow 194), as well as the transmission plate 94 (arrow 196), as a result of which the axle 120 and the transmission pinion gear 126 are rotated by the pinion gear 124 along the longitudinal axis of the axle 120 in direction of arrows 198. It is appreciated that the axle 120 rotates about its longitudinal axis and simultaneously rotates over the transmission plate 94 (together with housing 28), in direction of arrow 199. The transmission pinion gears 126 are concatenated with teeth 116 of one of the gear rings $110_1$ to $110_{20}$, whereby rotation of the transmission pinion gears 126 in direction of arrow 198, entails a resultant rotatory motion of the gear plate 100, the output shaft 102 and the ratchet mechanism 105 articulated thereto, in direction of arrows 200.

As gears are shifted, the transmission pinion gear 126 smoothly radially displaces between the respective gear rings $110_i$ of the gear plate 100, thus changing the gear transmission ratio respectively, where upshift causes the transmission pinion gear 126 to radially displace inwards towards a smaller gear ring, and downshift causing the transmission pinion gear 126 to radially displace outwards, towards a larger gear ring. It is appreciated that the gear teeth of the transmission pinion gears 126 and the gear rings $110_1$ to $110_{20}$ are designed so the number of teeth is proportional to the radius of the respective pitch circle of each gear, so the pitch circles of the meshing gears roll on each other smoothly without slipping, i.e., the pitch of any two teeth on the gear plate is constant and equal to pitch of the transmission pinion gear 126.

Figure 11:
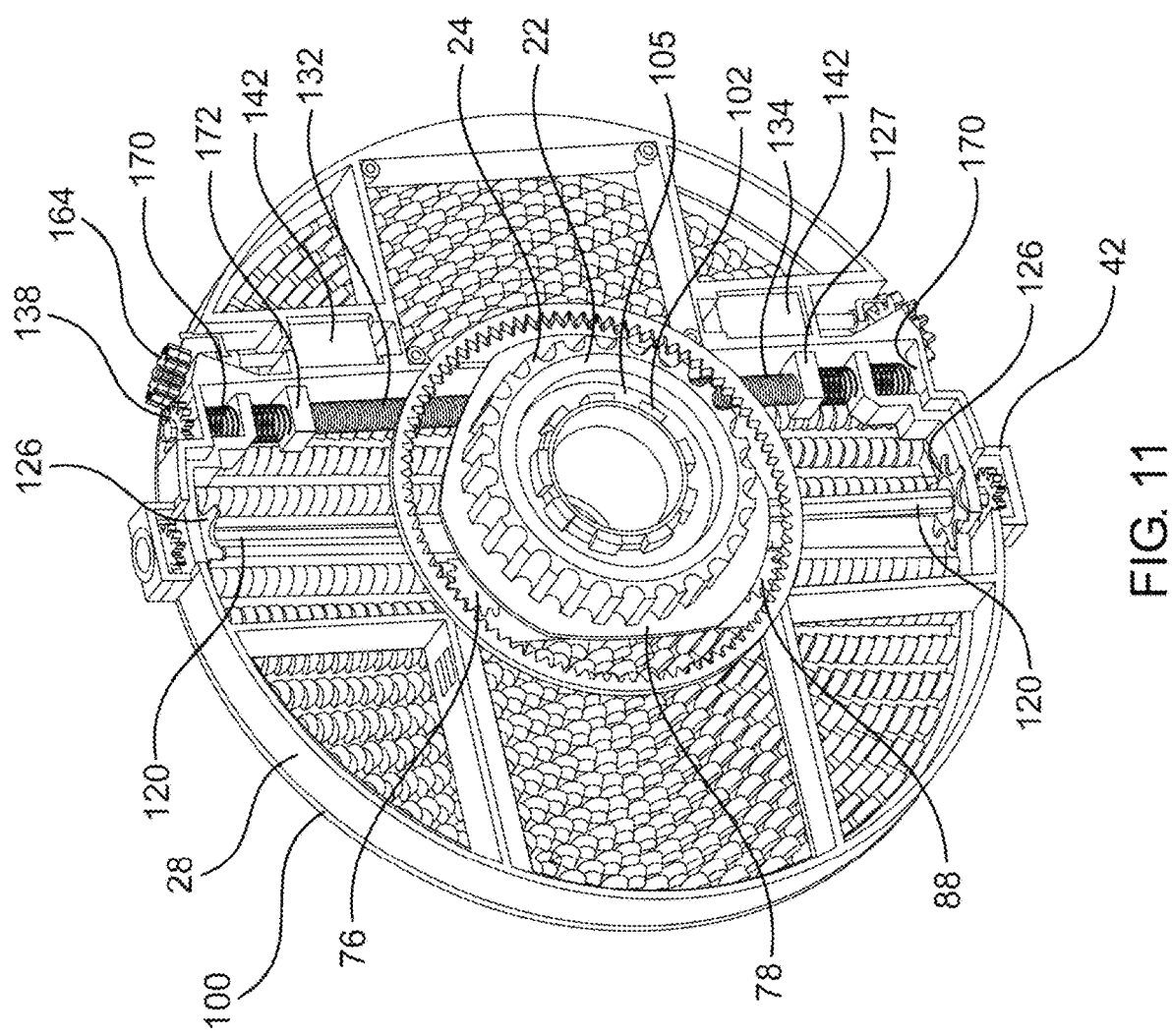
FIG. 11 is a perspective rear side view of the gear transmission, with the transmission plate removed, illustrating the transmission pinion gear engaged with an outer most gear ring of the gear plate.

In FIG. 11 the gear transmission 20 of the previous example is shown, however with the transmission pinion gear 126 displaced into a radially outmost gear ring $110_{20}$ (often referred to as 'last gear') of the gear plate 100, i.e., the gear transition has been downshifted.

Figure 12:
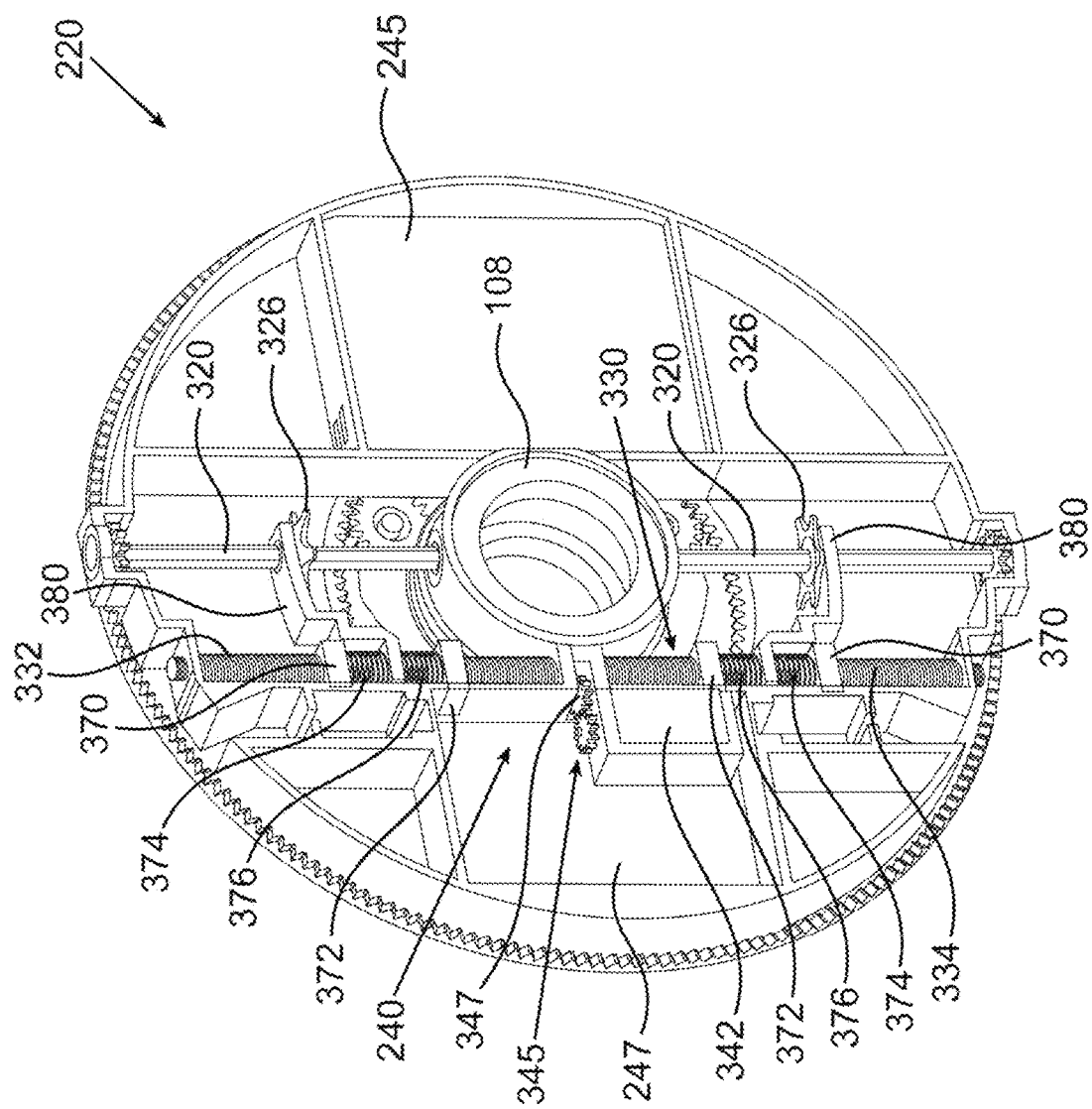
FIG. 12 is a perspective rear side view of the gear transmission, with the gear plate removed for exposing an alternative gear ratio changing mechanism according to an example of the disclosure, comprising a single electronic gear ratio changing mechanism.

Turning now to FIG. 12, there is illustrated a gear transmission according to a modification of the disclosure, generally designated 220, wherein like elements as in the previous drawings are designated with like reference numerals, though shifted by 200.

The gear transmission 220 is principally similar to gear transmission 20 and follows principals of the disclosure, however with the main differences residing in gear ratio changing mechanism generally designated 240. Instead of a top sub-assembly 240T and a bottom sub-assembly 240B (one for upshifting and another for downshifting), the gear ratio changing mechanism 240 is configured with a single assembly comprising a step motor 342 engaged through a gear train 345 with a gear 347 fixedly mounted on the threaded rod 330, which too is composed of a top portion 332 and a bottom portion 334 opposed in their threading direction.

Mounted on the threaded rod 330 are two gear transmission levers 380 disposed between coiled compression sprigs 374 and 376, which in turn bear between a first nut 370 and second nut 372, wherein each transmission levers 380 carries a respective transmission pinion gear 326, which are free to radially axially displace along axle 320 and are confined for rotation thereby.

The gear transmission 220 further comprises a power source, namely rechargeable battery 245 and a controller, namely PCB 247.

The arrangement is such that the step motor 342 receives a rotation signal from the PCB 247 to rotate in either direction (responsive to an upshift/downshift command, respectively), whereby a rotation signal causes the step motor 342 to rotate, resulting in a corresponding revolution of the threaded rod 330, and respective displacement of the two gear transmission levers 380 (in mirror fashion displacement), entailing the respective transmission pinion gears 326 to radially displace respectively (also in a mirror fashion).

It is appreciated that the downshifting and upshifting is dictated by direction of rotation of the step motor 342. Furthermore, a single shift command results in gear shift of only one gear ring, whereby a prolonged shift command results in multiple ratio gear change, effected through radial displacement of the transmission pinion gears 326 along the axle 320, along the gear rings $110_1$ to $110_{20}$ (not seen in FIG. 12).

Figure 13:
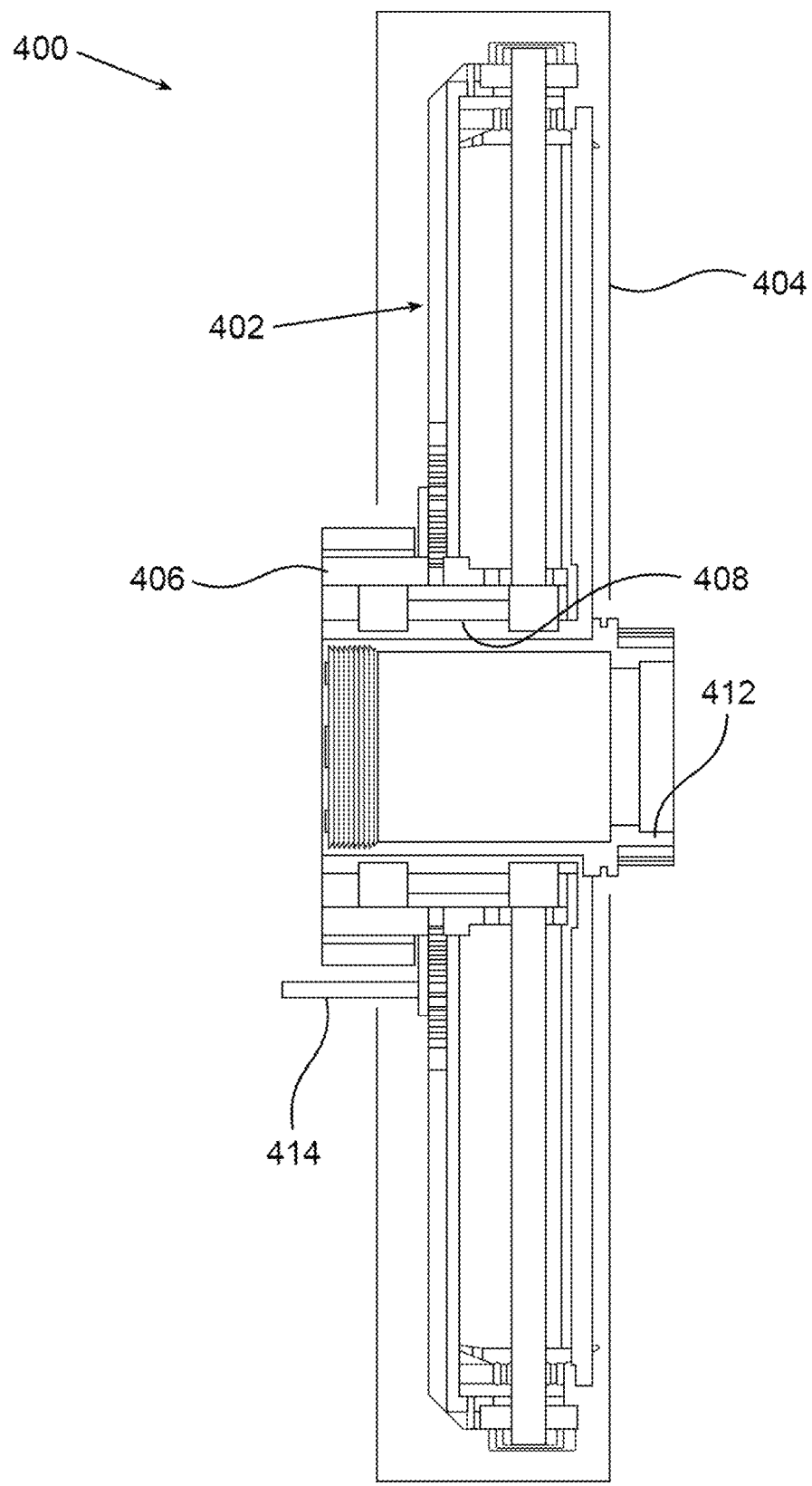
FIG. 13 is a longitudinal, side section, schematically illustrating a casing encapsulating a gear transmission according to an example of the disclosure.

In FIG. 13 there is illustrated a gear transmission assembly 400 comprising a gear transmission 402 according to any configuration of the disclosure, and wherein the gear transmission 402 is enclosed within a casing 404, where said housing has a disc-like shape encapsulating the entire gear transmission 402, such that only the input shaft 406 and a free-hub 412 (articulated to the output shaft 408) project from the hub of the housing, at opposite sides thereof, and further wherein a carrier plate arresting pin 414 projects through the casing or is articulated thereto for rotatably fixing the carrier plate of the planetary gear assembly. The casing arrangement is useful for guarding the gear transmission 402.

Figure 4:
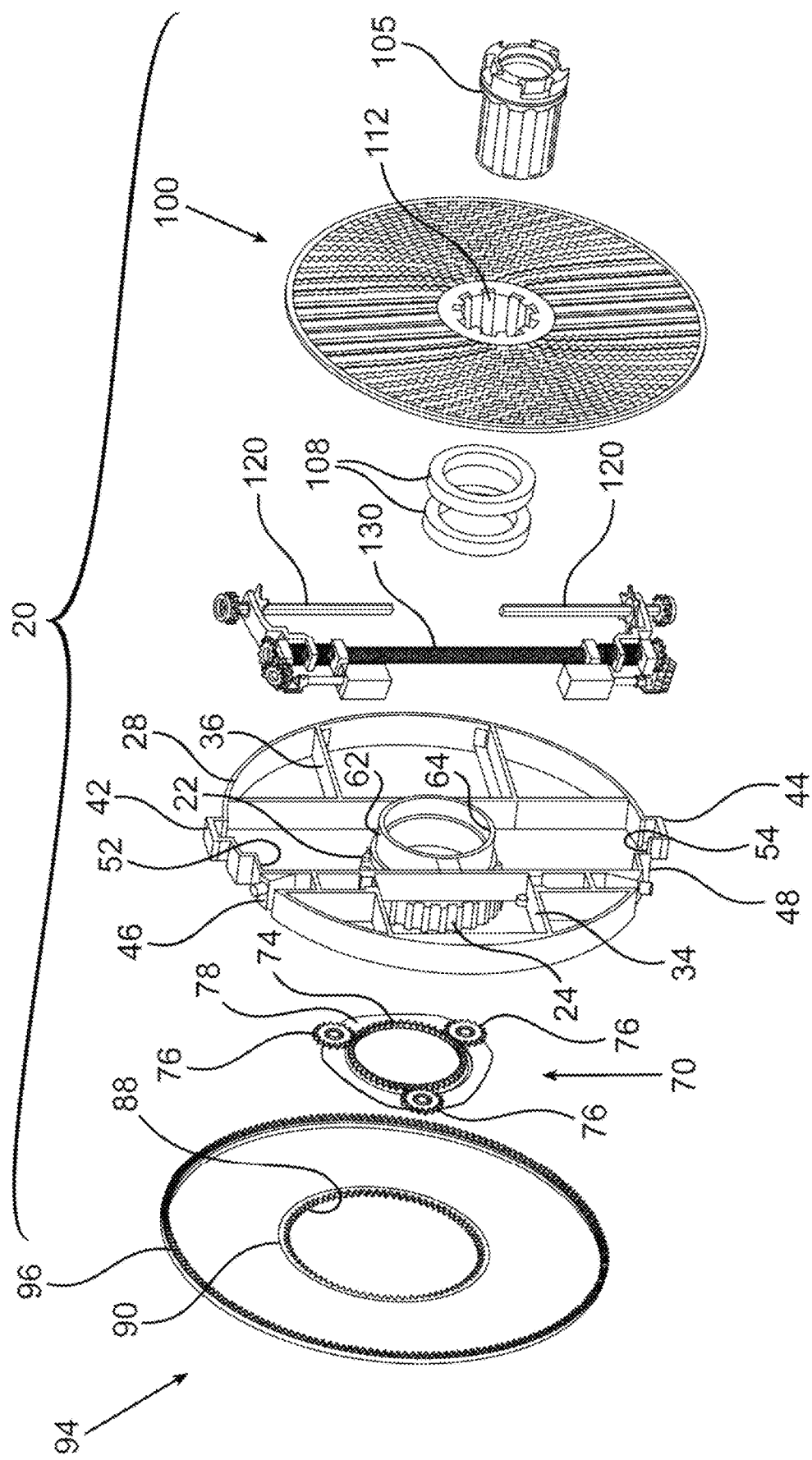
FIG. 4 is an exploded view of FIG. 2A.

FIGS. 14A to 14D schematically illustrate another possible embodiment 20' of the transmission 20, implemented without the planetary gear assembly (70 in FIG. 4). Components of the transmission 20' shown in FIGS. 14A to 14D are similar to those of the transmission 20 described hereinabove in reference to the previous drawings. Thus, same reference numerals are used in FIGS. 14A to 14D to identify same/similar components, while components which were changed/modified are identified by an apostrophe suffix.

Figure 14A:
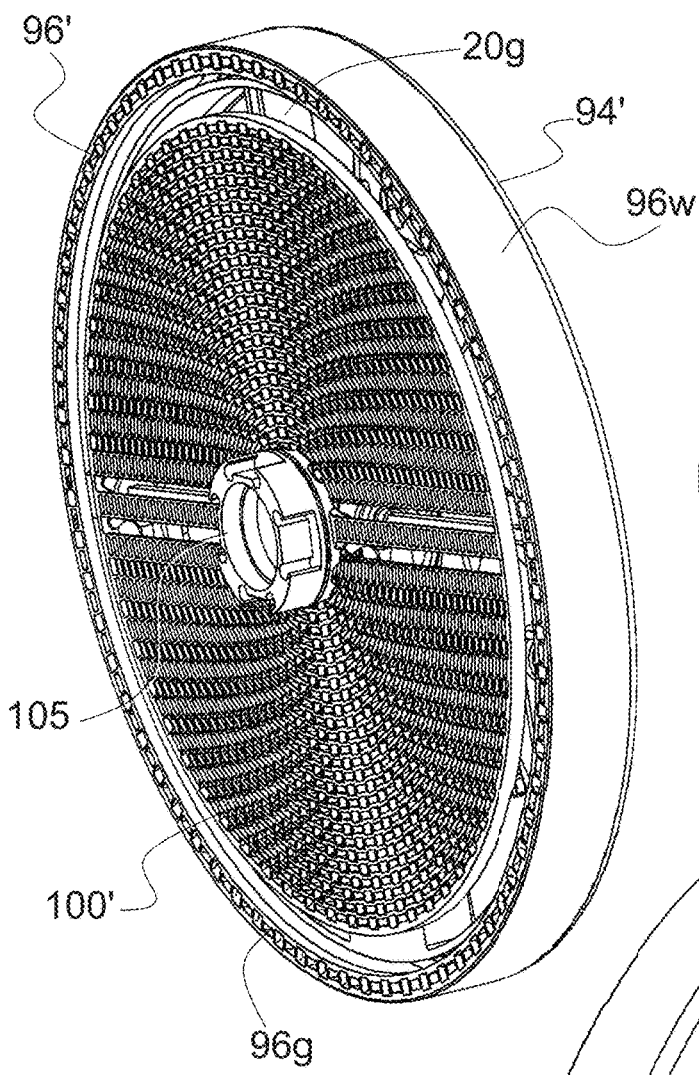
Figure 14B:
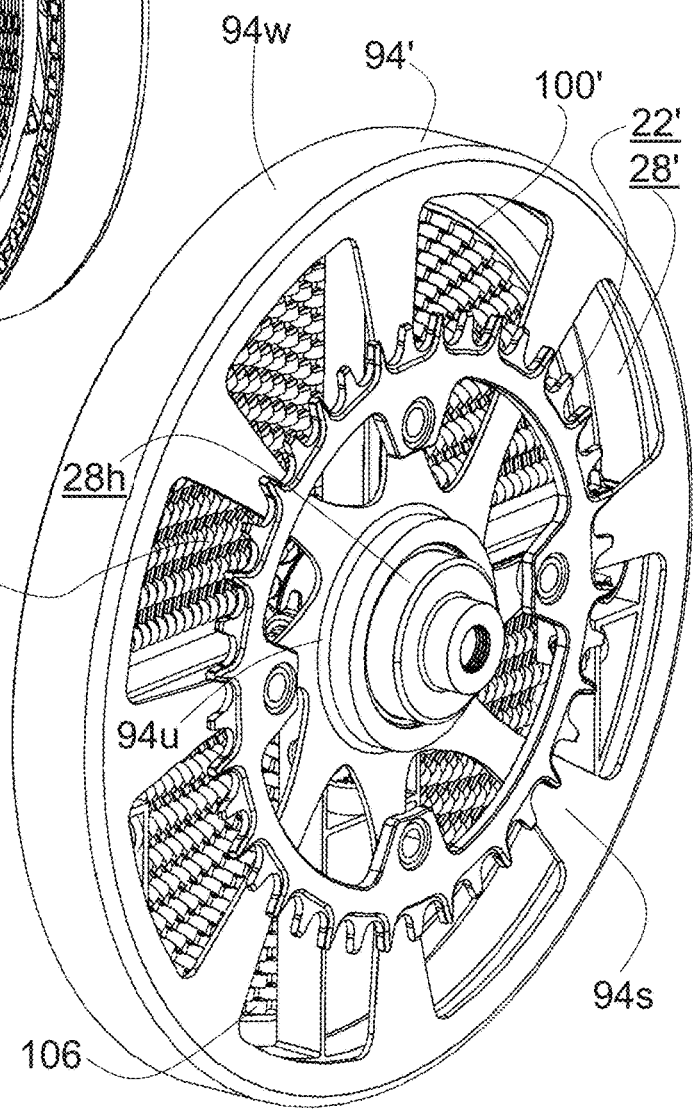

FIGS. 14A and 14B show back and front perspective views of the transmission 20' having a transmission plate 94' made in a form of a spoke wheel having a plurality of supports 94s radially extending from a central hub 94u, and a circumferential wall 94w axially extending from the external perimeter of the transmission plate 94' forming a circular enclosure accommodating components of the transmission 20'. In this embodiment the transmission plate 94' comprises a peripheral gear ring 96' formed in a rim internally extending from the edge of the circumferential wall 94w. The peripheral gear ring 96' is formed in this non-limiting example by a plurality of openings 96g formed in the internal rim of the peripheral gear ring 96' for engagement with a toothed wheel (124), but of course other possible configurations of the peripheral gear ring 96' can be similarly implemented.

Figure 14C:
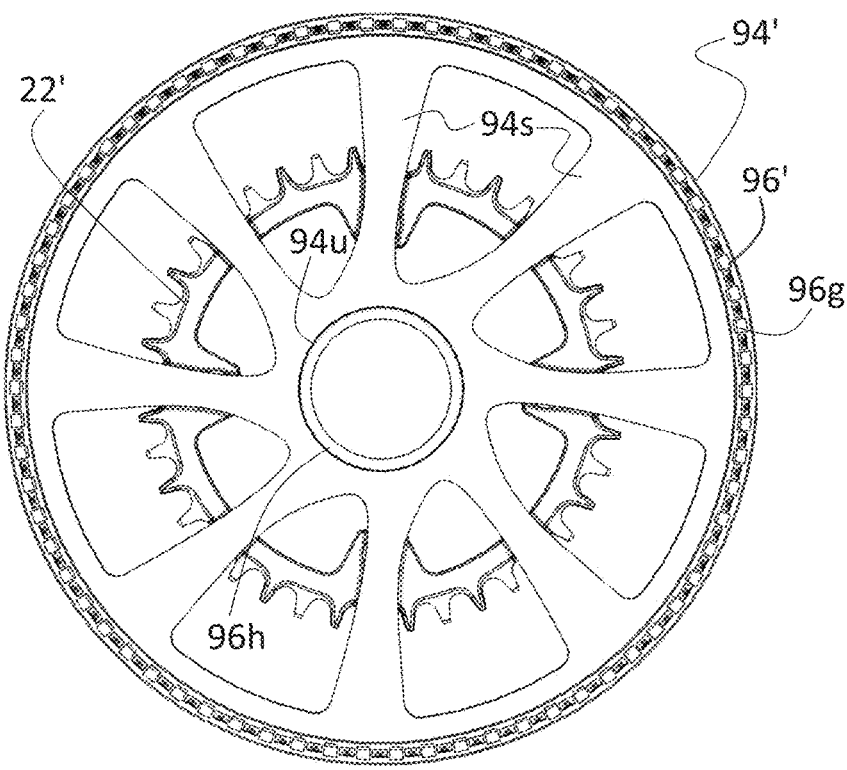

The transmission 20' comprises a gear plate 100', which can be substantially aligned with the internally extending rim of the peripheral gear ring 96', thereby closing the internal space enclosed by the circumferential wall 94w, while leaving a small annular gap 20g therebetween. Optionally, but in some embodiments preferably, the transmission plate 94' is configured to receive input rotary motion and transfer it to internal elements mounted inside the cavity enclosed by circumferential wall 94w the of the transmission 20'. Thus, in this specific and non-limiting example, a cogged-wheel (e.g., sprocket-wheel) 22' is concentrically mounted on the transmission plate 94' e.g., attached to the radial supports 94s. FIG. 14C shows a back view of the transmission plate 94' with the cogged-wheel 22' posteriorly attached to its radial supports 94s.

Figure 14D:
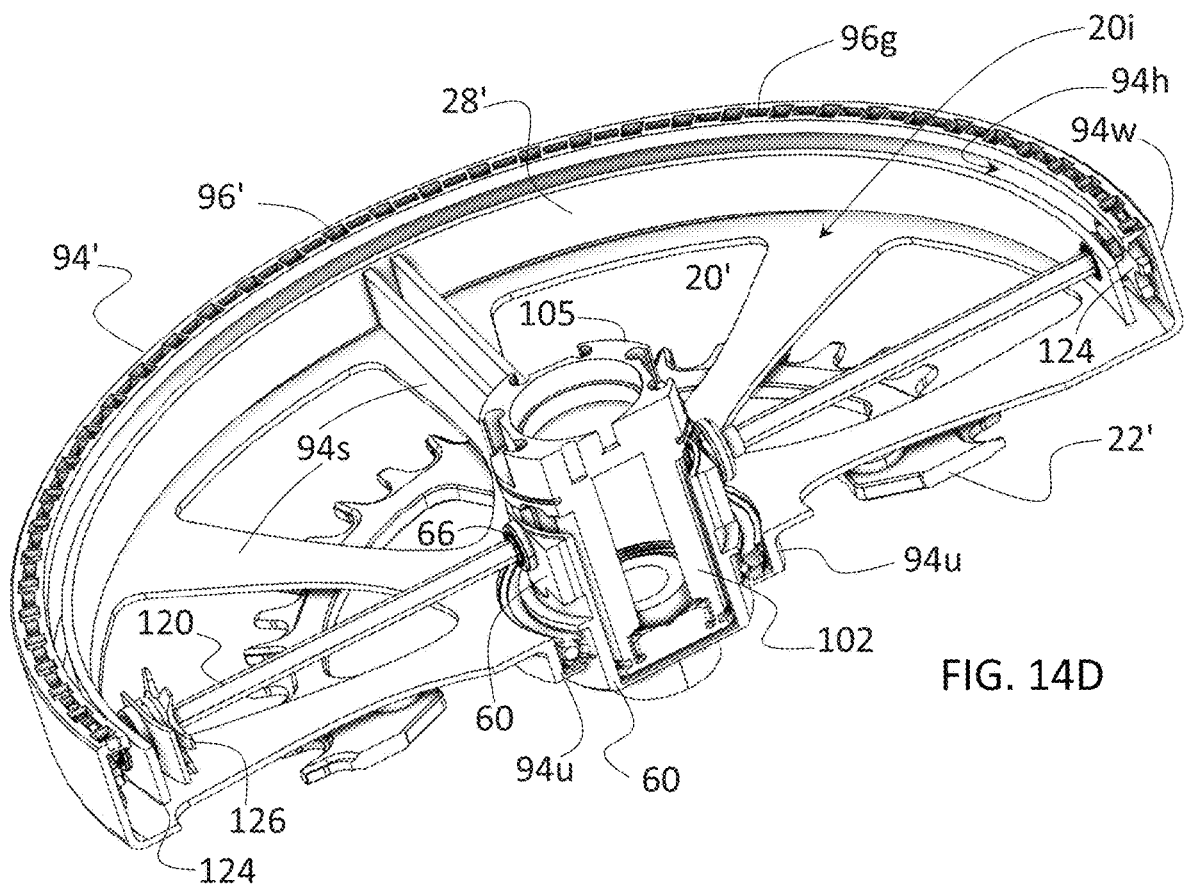

In FIG. 14D a sectional back perspective view of the transmission 20' is shown without the gear plate 100' and without the gear ratio changing mechanism. As seen, the internal space 201 of the transmission 20' accommodates the internal housing 28' concentrically mounted over the rotatable hub assembly 105, with the two rotatably hexagonal axles 120 radially extending in opposite directions from its central hub 60. The functionality and operation of the transmission pinion gears 126 (only one transmission pinion gears 126 is shown in FIG. 14D) of the transmission 20', slidingly mounted over the hexagonal axles 120, is congruent with the embodiments disclosed hereinabove, and thus will be explained herein again, for the same of brevity.

As best seen in FIG. 14D, the circumferential wall 94w and the internal rim of the peripheral gear ring 96' form an internal channel 94h configured to receive the pinion gears 124 attached at the extremities of the hexagonal axles 120, and rotate thereabout. The teeth of the pinion gears 124 are configured to internally engage the opening 96g of the peripheral gear ring 96', and thereby transfer the input rotary motion received in some embodiment by the transmission plate 94' to the internal housing 28'. In possible embodiments the central hub 60 of the internal housing 28' is fixed/anchored e.g., to a chassis, such as a bicycle's chassis.

FIGS. 15A to 15H schematically illustrate another possible embodiment 20* of the transmission 20 implemented without the planetary gear assembly. Components of the transmission 20* shown in FIGS. 15A to 15H are similar to those of the transmission 20 and/or 20' described hereinabove in reference to the previous drawings. Thus, same reference numerals are used in FIGS. 15A to 15H to identify same/similar components, while components which were changed/modified are identified by an apostrophe asterisk.

Figures 15A, 15B:
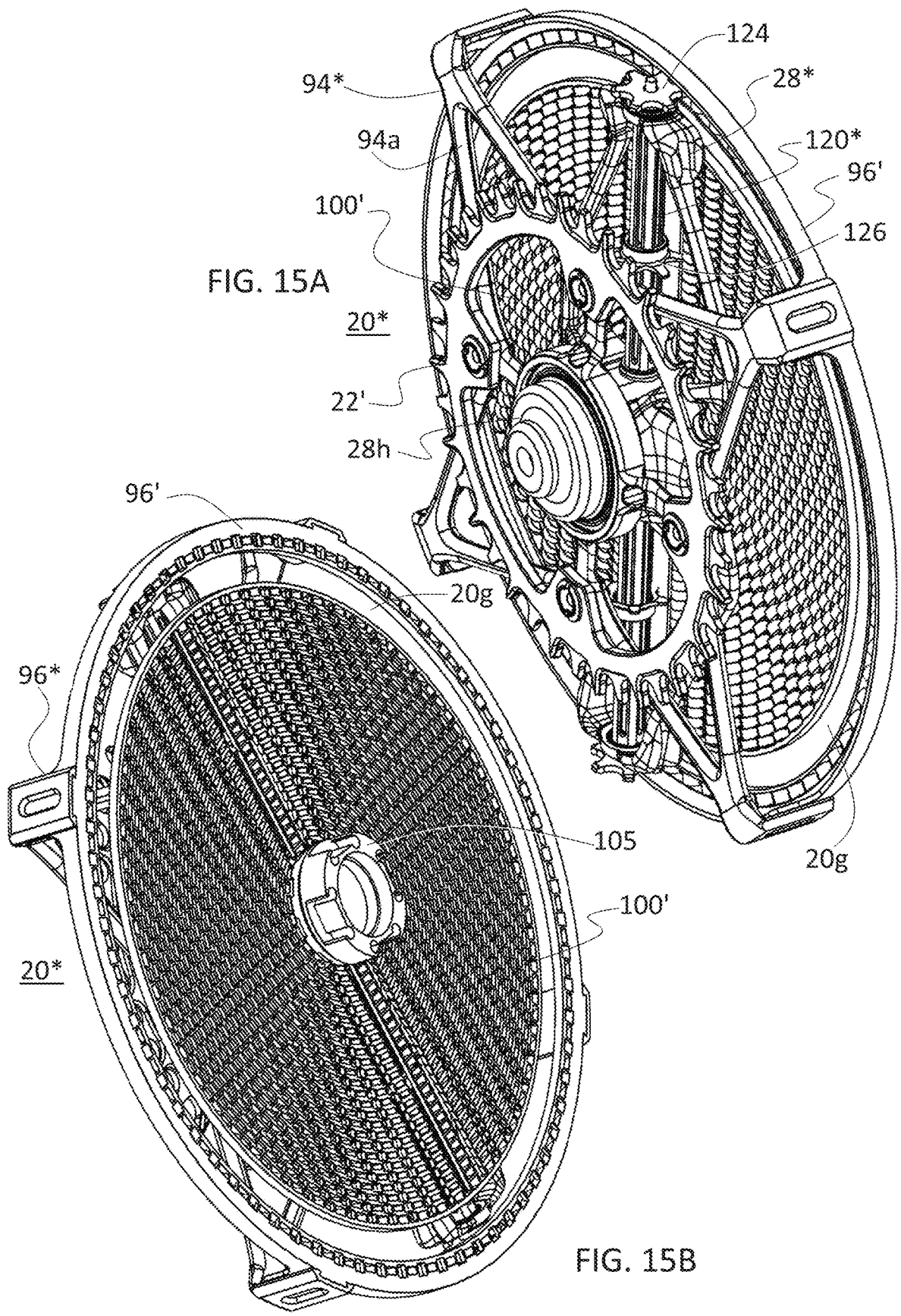

With reference to FIG. 15A, showing a front perspective view of the transmission 20* which transmission plate 94* is reduced into a chassis structure configured to support the peripheral gear ring 96' by a plurality of "V"-shaped arms 94a (four "V"-shaped arms 94a are used in this example). The ends of the flaring arms of the of "V"-shaped arms 94a are connected to the central hub 94u of the transmission plate 94*, and their apexes are connected to the peripheral gear ring 96', respective supports. In possible embodiments is the transmission plate 94* is configured to receive input rotary motion and transfer it to internal elements of the transmission 20'. Thus, in this specific and non-limiting example, a cogged-wheel (e.g., sprocket-wheel) 22' is concentrically mounted on the transmission plate 94* e.g., attached to the "V"-shaped arms 94a.

Figure 15C:
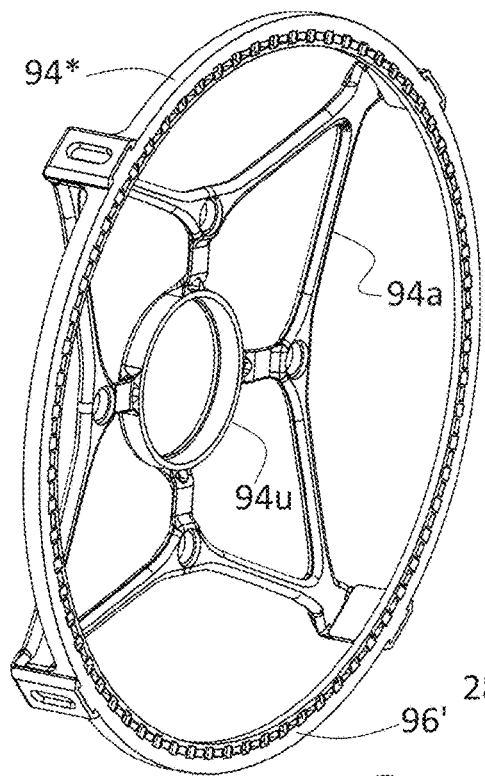

FIG. 15B shows a back perspective view of the transmission 20*, exemplifying the gear plate 100' in alignment with the peripheral gear ring 96' thereby substantially closing the back side of the transmission 20*, while leaving a small gap 20g therebetween. FIG. 15C shows a back perspective view of the transmission plate 94*.

Figure 15D:
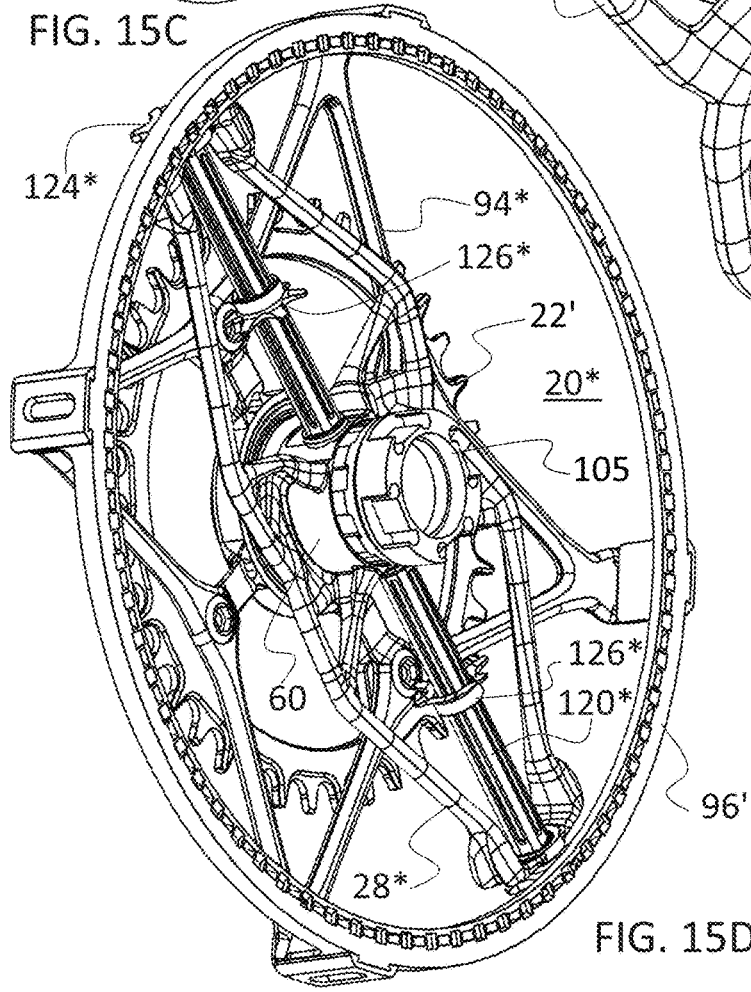
Figure 15E:
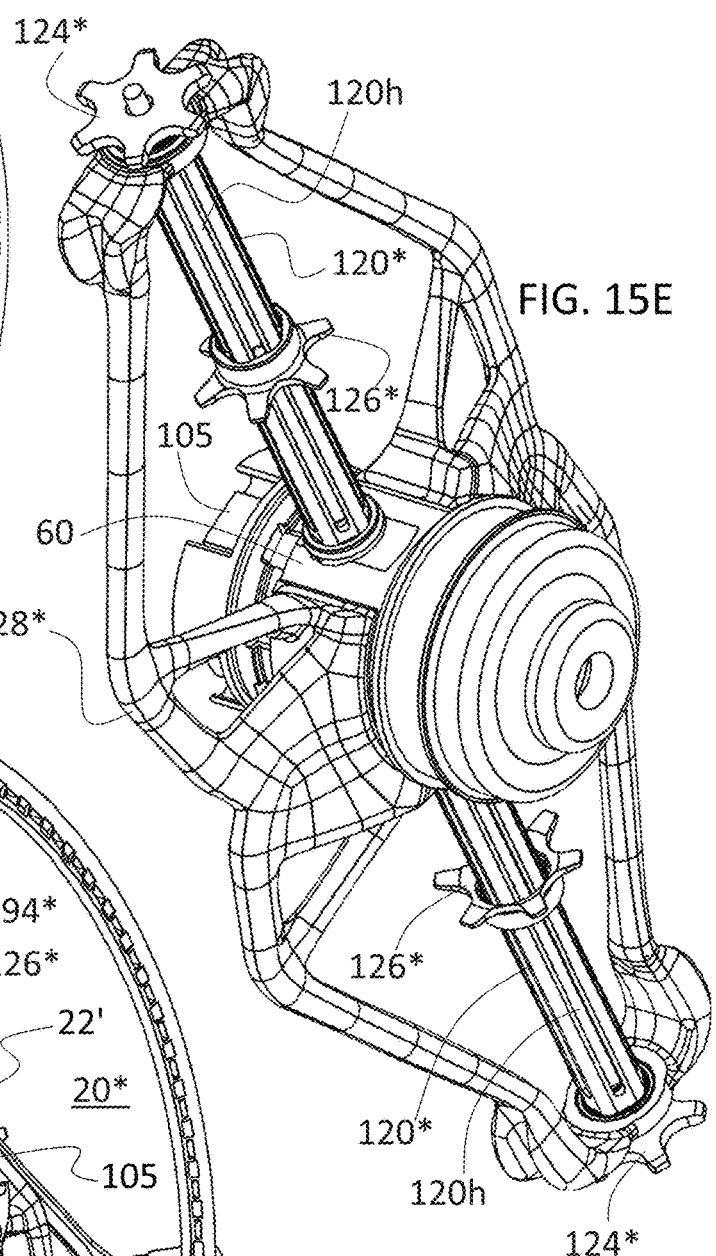

Referring now to FIG. 15D, showing a back perspective view of the transmission 20* without the gear plate 100', and the internal housing 28* of the transmission 20* reduced in this embodiment into a chassis structure having rib elements extending in sideway directions from the central hub 60 of the housing 28* and converging outwardly therefrom towards the end sections of the rotatable axles 120*. As better seen in FIG. 15E, the axles 120* are configured with an elongated internal cavity accessible via a plurality of pass-through elongated channels 120h formed along their lengths.

As seen in FIG. 15F, in this embodiment each one of the axles 120* comprises an internal threaded rod 130* rotatably accommodated inside its elongated internal cavity for controllably translating the transmission pinion gear 126* over the axle 120*. For this purpose, each of the transmission pinion gears 126* comprises an internal nut 126n connected to the pinion gear 126* by pins/studs 126t, and screw mounted on the internal threaded rod 130*, as best seen in the sectional views of FIGS. 15G and 15I. Accordingly, the transmission pinion gear 126* is rotatable by the axle 120*, while its internal nut 126n is screw mounted on the threaded rod 130*, which is loosely positioned at the center of the axle 120*. This configuration is utilized for implementing a novel gear ratio changing mechanism, as will be explained in detail hereinbelow.

Referring now to FIGS. 15F, and 15G, 15H and 15I, in some embodiments the gear ratio changing mechanism is implemented utilizing a small planetary gear system 57 housed inside a compartment 56 at the extremity of the axle 120*. FIG. 15H shows a sectional view of the axle 120* at cross-section H-H in FIG. G, showing the connection of the transmission pinion gear 126* to the threaded rod 130* via the nut 126n and pins/studs 126t. FIG. 15I shows a sectional view of the axle 120* at cross-section I-I in FIG. G, showing the compartment 56 without its cover element 56c, and a mechanism 57 mounted thereinside for controllably manipulating rotary motion of the threaded rod 130*.

In some embodiments the mechanism 57 is implemented by a gear system, such as a planetary gear system, coupling between the threaded rod 130* and the pinion gear 124*. Particularly, the threaded rod 130* is coupled to the sun gear 124r of the planetary gear system 57 mechanism, and the planetary pinion gears 56g of the planetary gear system 57 are assembled on a carrier 56y fixedly attached to the upper face of the pinion gear 124*.

When all elements of the planetary gear are free to move (i.e., they are not externally manipulated), the threaded rod 130* is rotated with the axle 120* at the same angular velocity. When the sun gear 124r (and thus the threaded rod 130*) is held stationary (e.g., due to application of external manipulation) while the axle 120* is rotating the transmission pinion gear 126* will displace in one direction along the axle. When the sun gear 124r is free to rotate while the ring gear 56p is held stationary (e.g., due to application of external manipulation), the sun gear 124r will rotate in the same direction as the axle 120*, but with a faster angular velocity, thereby causing the transmission pinion gear 126* to displace in the opposite direction along the axle 120*. This manipulator mechanism can thus controllably set the position of the transmission pinion gear 126* to engage any of the gear rings 110$_i$ of the gear plate 100'.

Optionally, but in some embodiments preferably, the force used for controlling the displacement of the transmission pinion gear 126* is provided by the user (e.g., bicycle rider) e.g., using a small/miniature motor or solenoid to hold in position/stationary the sun or ring gears 124*r* and 56*p*.

The invention claimed is:

1. A gear transmission comprising: a housing accommodating a gear ratio changing mechanism and having a central hub; a gear plate articulated to an output shaft coaxially rotatable about an axis of said central hub, said gear plate comprising a plurality of coaxially disposed gear rings selectively engaged by said gear ratio changing mechanism; a transmission plate coaxially rotatable about an axis of said central hub of said housing and having a peripheral gear ring coupled to said gear ratio changing mechanism, said gear ratio changing mechanism comprising: a pinion gear rotatably articulated with an axle and engaged with the peripheral gear ring of the transmission plate for transferring input rotary motion thereby received to said axle; a transmission pinion gear rotatable by said axle and being displaceable along said axle for engaging one of the coaxially disposed gear rings of said gear plate; and a manipulator configured for selective radial displacing the transmission pinion gear over said axle between gear rings of the gear plate.

2. The gear transmission of claim 1, comprising a planetary gear assembly configured with a sun gear fixedly articulated to an input shaft, wherein a ring gear of said planetary gear assembly fixed at a hub of the transmission plate.

3. The gear transmission of claim 2, wherein the planetary gear assembly comprises several planetary pinion gears rotatably mounted on a carrier of the planetary gear assembly, said carrier being rotatably fixed, whereby the sun gear and the ring gear rotate at an opposite sense.

4. The gear transmission of claim 1, wherein the gear ratio changing mechanism comprises one or more of the following: an upshift gear assembly and a downshift gear assembly, independent from one another, and configured for radial displacing the transmission pinion gear radially, wherein the upshift gear assembly is configured for displacing the transmission pinion gear radially inwards towards a smaller gear ring, and the downshift gear assembly is configured for displacing the transmission pinion gear radially outwards towards a larger gear ring; two or more gear changing sub-assemblies, operating in opposite sense, resulting in that the transmission pinion gears the sub-assemblies move simultaneously and in register towards one another or away from one another, a gear changing pinion gear configurable for selectively engaging with the peripheral gear ring of the transmission plate, and a manipulating pinion gear engageable with the gear changing pinion gear, said manipulating pinion gear fixed over a threaded rod, whereby rotation of the threaded rod entails displacement of the manipulator which in turn entails radial displacement of the transmission pinion gear about a rotating axle extending about the radial axis of the transmission pinion gear: one or more electric manipulators configurable for radial displacing the transmission pinion.

5. The gear transmission of claim 1, wherein the gear ratio changing mechanism is configured with a threaded rod rotatably disposed inside a cavity formed in the axle, wherein the transmission pinion gear is screw mounted on said threaded rod via one or more pass-through channels formed in said axle, whereby rotation of the threaded rod entails radial displacement of the transmission pinion gear over the axle, said ratio changing mechanism further comprising a mechanism coupling between said threaded rod and the pinion gear for controlling rotary motion of said threaded rod and setting position of said transmission pinion gear over said axle.

6. The gear transmission of claim 1, wherein the manipulator comprises a manipulable lever configurable for radial displacing the transmission pinion at a radially inwards or a radially outwards direction.

7. The gear transmission of claim 6, wherein the manipulable lever is spring biased into one or two directions along an axial path.

8. The gear transmission of claim 2, wherein the planetary gear assembly comprises several planetary pinion gears rotatably mounted on a carrier of the planetary gear assembly, said carrier being one of the following: rotatably fixable to a bicycle frame member, fixable to a chainstay of the bicycle frame: secured to an external frame member supporting the gear transmission: magnetically arrested to an externally disposed stationary element.

9. The gear transmission of claim 1, wherein the transmission pinion gear has one of the following configurations: it is coaxially rotatably articulated with the pinion gear; it is displaceable along a radial axis offset with respect to the radial axis of the pinion gear, and rotatably articulated to the pinion gear; it is displaceable along a non radial chord of the gear plate, and rotatably articulated to the pinion gear.

10. The gear transmission of claim 1, wherein the manipulator is activated by an electrical power operated motor or by activating its manipulable lever by a manual shifting mechanism.

11. The gear transmission of claim 1, wherein the gear transmission is configured with one of the following: two or more gear ratio changing mechanisms, each associated with a corresponding transmission pinion gear; two or more transmission pinion gears, each rotatably articulated with a respective pinion gear; two or more transmission pinion gears, each rotatably articulated on a radially extending axis and equi-radially spaced apart.

12. The gear transmission of claim 1, wherein the gear plate is configured with a gear shifting zone, wherein at a gear shifting zone the teeth of neighboring gear rings, are aligned along a radius of the gear plate.

13. The gear transmission of claim 1, wherein the gear plate is configured with at least one of: two or more gear shifting zones, wherein two opposite gear shifting zones are disposed along a radii of the gear plate; a plurality of gear teeth are disposed from both sides of each gear shifting zones, along a circular path of each gear ring, whereby the teeth along a circular path are gradually shifted, in a diverging and converging arrangement, where at the gear shifting zones all teeth of all gear rings are coaxial with no radial shift therebetween: the gear rings arranged such that each tooth of a gear ring, other than the smallest gear ring and the largest gear ring, is in contact with a at least two neighboring teeth, one of a smaller gear ring and one of a larger gear ring.

14. The gear transmission of claim 13, comprising supports connecting between at least some of the teeth in each of the gear rings.

15. A power machine actuated by a rotating power force driving a gear transmission of said power machine, said gear transmission comprising: a housing accommodating a gear ratio changing mechanism and having a central hub; a gear plate articulated to an output shaft coaxially rotatable about an axis of said central hub, said gear plate comprising a plurality of coaxially disposed gear rings selectively engaged by said gear ratio changing mechanism; a transmission plate coaxially rotatable about an axis of said central hub of said housing and having a peripheral gear ring coupled to said gear ratio changing mechanism, said gear ratio changing mechanism comprising: a pinion gear rotatably articulated with an axle and engaged with the peripheral gear ring of the transmission plate for transferring input rotary motion thereby received to said axle; a transmission pinion gear rotatable by said axle and being displaceable along said axle for engaging one of the coaxially disposed gear rings of said gear plate; and a manipulator configured for selective radial displacing the transmission pinion gear over said axle between gear rings of the gear plate, and wherein one of the transmission plate and the output shaft is connectable to the rotating power source and the other one of the transmission plate and the output shaft is connectable to a rotating driven power unit.

16. The power machine of claim 15, comprising a planetary gear assembly configured with a sun gear fixedly articulated to an input shaft, wherein a ring gear of said planetary gear assembly fixed at a hub of the transmission plate.

17. A bicycle configured with a gear transmission, the gear transmission comprising: a housing accommodating a gear ratio changing mechanism and having a central hub; a gear plate articulated to an output shaft coaxially rotatable about an axis of said central hub, said gear plate comprising a plurality of coaxially disposed gear rings selectively engaged by said gear ratio changing mechanism; a transmission plate coaxially rotatable about an axis of said central hub of said housing and having a peripheral gear ring coupled to said gear ratio changing mechanism, said gear ratio changing mechanism comprising: a pinion gear rotatably articulated with an axle and engaged with the peripheral gear ring of the transmission plate for transferring input rotary motion thereby received to said axle; a transmission pinion gear rotatable by said axle and being displaceable along said axle for engaging one of the coaxially disposed gear rings of said gear plate; and a manipulator configured for selective radial displacing the transmission pinion gear over said axle between gear rings of the gear plate, and wherein the transmission plate is rotatably manipulable by a bicycle crank assembly and the output shaft is engageable with a rear hub assembly of a rear bicycle wheel.

18. The bicycle of claim 17, comprising a planetary gear assembly configured with a sun gear fixedly articulated to an input shaft, wherein a ring gear of said planetary gear assembly fixed at a hub of the transmission plate.

19. A rear wheel for a bicycle configured with a gear transmission, the gear transmission comprising: a housing accommodating a gear ratio changing mechanism and having a central hub; a gear plate articulated to an output shaft coaxially rotatable about an axis of said central hub, said gear plate comprising a plurality of coaxially disposed gear rings selectively engaged by said gear ratio changing mechanism; a transmission plate coaxially rotatable about an axis of said central hub of said housing and having a peripheral gear ring coupled to said gear ratio changing mechanism, said gear ratio changing mechanism comprising: a pinion gear rotatably articulated with an axle and engaged with the peripheral gear ring of the transmission plate for transferring input rotary motion thereby received to said axle; a transmission pinion gear rotatable by said axle and being displaceable along said axle for engaging one of the coaxially disposed gear rings of said gear plate; and a manipulator configured for selective radial displacing the transmission pinion gear over said axle between gear rings of the gear plate, and wherein the transmission plate is configurable for rotation by a bicycle crank assembly and the output shaft is configurable for engaging with a rear hub assembly of the rear bicycle wheel.

20. The rear wheel of claim 19, comprising a planetary gear assembly configured with a sun gear fixedly articulated to an input shaft, wherein a ring gear of said planetary gear assembly fixed at a hub of the transmission plate.

* * * * *